(12) United States Patent
Shabi et al.

(10) Patent No.: US 12,511,262 B1
(45) Date of Patent: Dec. 30, 2025

(54) TECHNIQUES FOR EFFICIENT FLUSHING USING OPPORTUNISTIC DEDUPLICATION

(71) Applicant: Dell Products L.P., Hopkinton, MA (US)

(72) Inventors: Uri Shabi, Tel Mond (IL); Maor Rahamim, Ramla (IL); Amit Zaitman, Shavey Shomron (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/903,350

(22) Filed: Oct. 1, 2024

(51) Int. Cl.
*G06F 16/174* (2019.01)
*G06F 16/16* (2019.01)
*G06F 16/17* (2019.01)

(52) U.S. Cl.
CPC ........ *G06F 16/1748* (2019.01); *G06F 16/164* (2019.01); *G06F 16/1734* (2019.01)

(58) Field of Classification Search
CPC . G06F 16/1748; G06F 16/164; G06F 16/1734
USPC ....... 707/610, 692, 625, 638, 646, 748, 749, 707/812, 999.101
See application file for complete search history.

(56) References Cited

U.S. PATENT DOCUMENTS

| | | | | |
|---|---|---|---|---|
| 11,294,871 | B2* | 4/2022 | Attarde | G06F 16/2282 |
| 11,385,806 | B1* | 7/2022 | Banerjee | G06F 3/0689 |
| 12,182,421 | B1* | 12/2024 | Vankamamidi | G06F 3/0641 |
| 2023/0325324 | A1* | 10/2023 | Tamilarasan | G06F 12/0888 |
| | | | | 711/133 |
| 2024/0192869 | A1* | 6/2024 | Natu | G06F 9/5016 |

* cited by examiner

*Primary Examiner* — Md I Uddin
(74) *Attorney, Agent, or Firm* — BainwoodHuang

(57) ABSTRACT

Techniques can include: recording, in a log, log entries for write operations writing data pages to logical addresses; and flushing the log entries from the log, wherein flushing includes performing deduplication of the data pages. Flushing can include: partitioning the data pages into i) a first portion of the data pages that are determined to be duplicates of existing data pages, and ii) a second portion of the data pages determined to be unique data pages; atomically incrementing reference counts each corresponding to one of the existing data pages determined as identical to a data page of the first portion; and atomically binding the logical addresses to the data pages, including: binding the first portion of data pages to a corresponding third portion of the logical addresses; and binding the second portion of data pages to a corresponding fourth portion of the logical addresses.

20 Claims, 18 Drawing Sheets

614: Allocate and initialize new VLB entries for the unique data pages of the unique page set as stored on BE non-volatile storage. Each new VLB entry references or points to a physical storage location of one of the unique data pages as stored on BE non-volatile storage. Each new VLB entry has a reference count that can be initialized to 1.

616: Perform processing to bind or map the target logical addresses to physical storage locations of corresponding data pages stored at the target logical addresses. The foregoing binding or mapping can be performed transactionally or atomically so that either all target logical addresses are mapped or bound, or none of the target logical addresses are mapped or bound.

Each target logical address has a corresponding unique MD leaf entry. Processing to bind the target logical address having a corresponding unique MD leaf entry can include updating the corresponding unique MD leaf entry to reference, or point to, a VLB entry corresponding to a data page stored at the target logical address. If the data page stored at the target logical address is included in the duplicate page set, the data page's corresponding VLB entry is an existing VLB entry of the first set, where the existing VLB entry's address can be obtained from the second set of VLB entry addresses stored in memory (e.g., in step 610).

If the data page stored at the target logical address is included in the unique page set, the data page's corresponding VLB is one of the new VLB entries. In at least one embodiment, all MD leaf entries corresponding to the target logical addresses written to by log entries of the working set can be updated transactionally or atomically as noted above.

In at least one embodiment, each MD leaf can be associated with a unique subrange of consecutive logical addresses mapped by corresponding entries of the MD leaf. In some scenarios, all or at least some of the target logical addresses bound can be included in the same single subrange associated with the same MD leaf. In this case, all target logical addresses falling in the same subrange associated with the same MD leaf can be bound to corresponding data pages by updating corresponding entries of the same MD leaf, where such data pages can include both unique data pages and duplicate data pages.

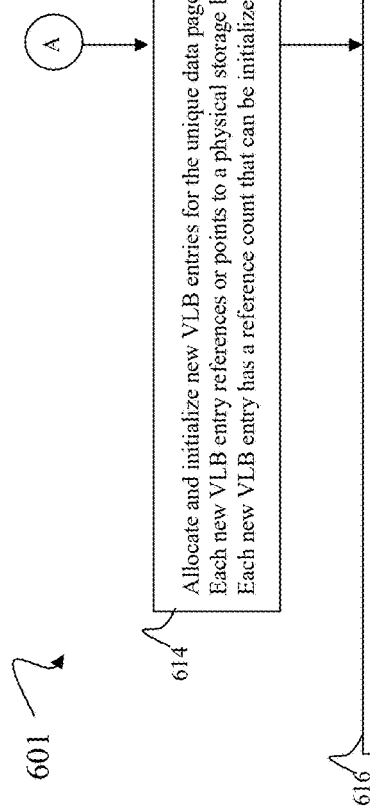

FIG. 9B

TECHNIQUES FOR EFFICIENT FLUSHING USING OPPORTUNISTIC DEDUPLICATION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving a plurality of write operations writing a plurality of data pages to a plurality of logical addresses, wherein each of the plurality of write operations writes one of the plurality of data pages to one of the plurality of logical addresses; recording each of the plurality of write operations in one of a plurality of log entries of a log; and flushing the plurality of log entries from the log, wherein said flushing includes performing deduplication of the plurality of data pages, said flushing including: partitioning the plurality of data pages into a first portion and a second portion, wherein the first portion includes data pages of the plurality of data pages that are determined to be duplicates of existing data pages already stored on a storage system, and wherein the second portion includes data pages of the plurality of data pages determined to be unique data pages that are not duplicates of the existing data pages already stored on the storage system; atomically incrementing reference counts each corresponding to one of the existing data pages determined as identical to one of the data pages of the first portion, where said each reference count denotes a number of times the corresponding one of the existing data pages is referenced and stored in a unique logical address; and atomically binding the plurality of logical addresses to the plurality of data pages, wherein said atomically binding includes: binding the first portion of data pages to a corresponding third portion of the plurality of logical addresses each storing one data page of the first portion written by one of the plurality of write operations; and binding the second portion of data pages to a corresponding fourth portion of the plurality of logical addresses each storing one data page of the second portion written by one of the plurality of write operations.

In at least one embodiment, atomically binding can include atomically binding metadata (MD) leaf entries to corresponding virtual layer block (VLB) entries, wherein each of the MD leaf entries is associated with one of the plurality of logical addresses, and wherein each of the corresponding VLB entries is associated with one of the plurality of data pages. The corresponding VLB entries can include first existing VLB entries and first new VLB entries, wherein each VLB entry of the first existing VLB entries references or points to a physical storage location on non-volatile storage of one of the existing data pages determined to be identical to a data page of the first portion, and wherein each VLB entry of the first new VLB entries references or points to a physical storage location on non-volatile storage of one of the unique data pages of the second portion. Atomically incrementing the reference counts can be performed prior to atomically binding the plurality of logical addresses to the plurality of data pages.

In at least one embodiment, a dedupe data store can include entries each corresponding to one of the existing data pages stored on the storage system, wherein each entry for said one existing data page includes i) a corresponding hash value for said one existing data page, and ii) first information used to locate a physical storage location storing said one existing data page. The first information can be a VLB entry referencing or pointing to the one existing data page.

In at least one embodiment, processing can include, for each data page of the plurality of data pages, performing first processing including: determining a calculated hash value for said each data page; determining whether the dedupe data store includes a first entry having a first hash value that is equal to the calculated hash value of said each data page, wherein the first hash value corresponds to a first of the existing data pages; and responsive to determining that the dedupe data store includes the first entry with a first hash value equal to the calculated hash value of said each data page, determining that said first existing data page is a candidate deduplication target potentially identical to said each data page. The first processing can include performing a data comparison of said first existing data page and said each data page to determine whether the first existing data page is identical to said each data page. Responsive to the data comparison determining that the first existing data page is identical to said each data page, said each data page may be included in the first portion of duplicate data pages. The first processing can include, responsive to determining that the dedupe data store does not include any entry with a hash value equal to the calculated hash value of said each data page, determining that said each data page is unique and including said each data page in the second portion of unique data pages.

In at least one embodiment, a fifth portion of the plurality of logical addresses can be included in a first logical address range of consecutive logical addresses associated with a first MD leaf page, wherein a sixth portion of the MD leaf entries are included in the first MD leaf page and used to bind the fifth portion of logical addresses to corresponding data pages stored at the fifth portion of logical addresses. The fifth portion of logical addresses can include i) one or more logical addresses of the third portion each storing a data page of the first portion determined to be a duplicate of an existing data page already stored on the storage system, and ii) one or more logical addresses of the fourth portion each storing a data page of the second portion determined to be unique and not a duplicate of an existing data page already stored on the storage system.

In at least one embodiment, atomically incrementing reference counts can be included in a first transaction, and atomically binding can be included in a second transaction different from the first transaction. Anatomically incrementing the reference counts can be performed prior to atomically binding the plurality of logical addresses to the plurality of data pages, and wherein atomically incrementing can complete successfully and atomically binding can fail to complete successfully. Responsive to atomically binding failing to complete successfully, performing rollback processing to rollback the incremented reference counts. The rollback processing can include decrementing each reference count previously incremented by said atomically incrementing.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 9A, 9B, 11, 12 and 13 are flowcharts of processing steps that can be performed in at least one embodiment in accordance with the techniques of the present disclosure.

DETAILED DESCRIPTION OF EMBODIMENT(S)

Figure 1:
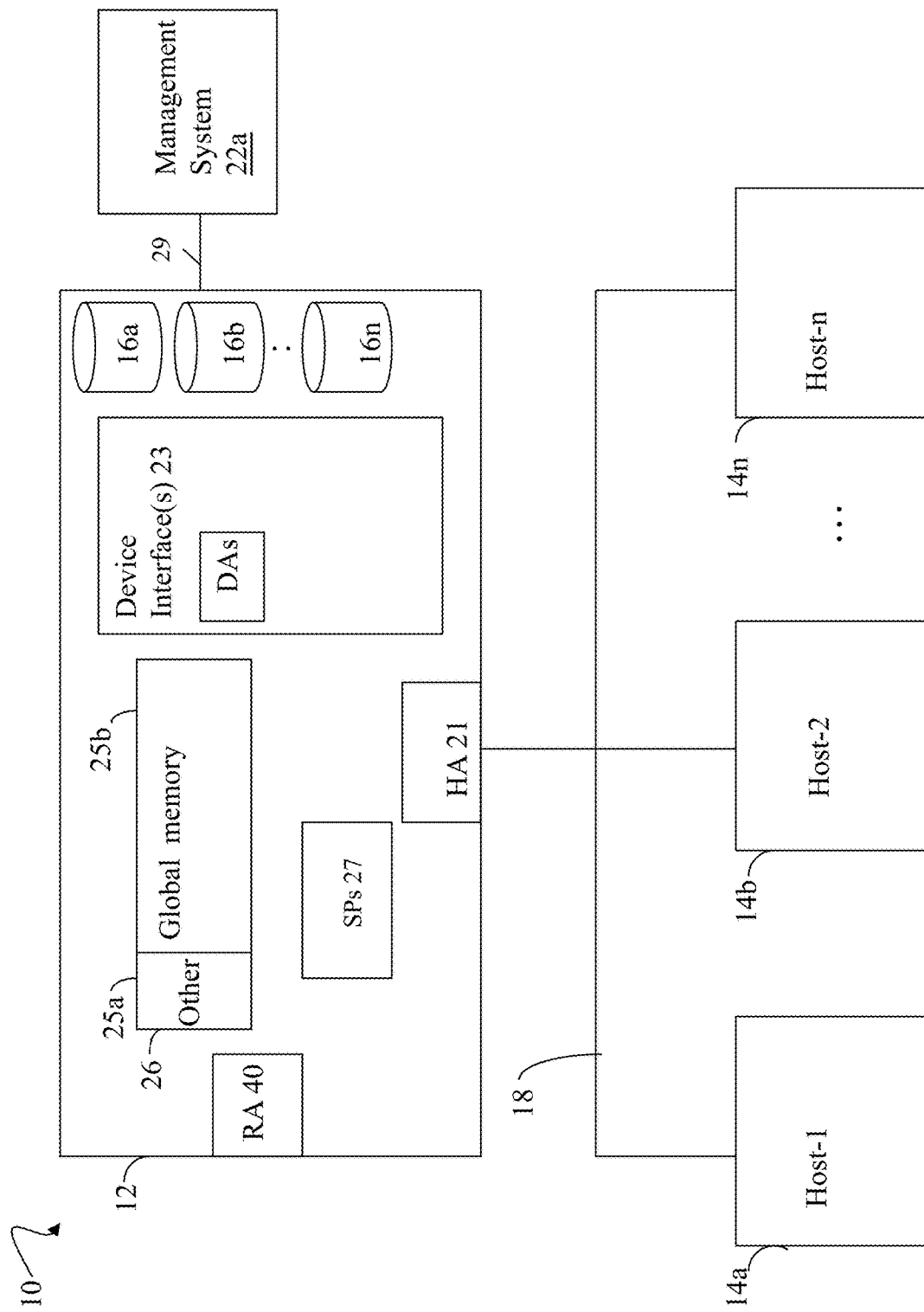
FIG. 1 is an example of components that may be included in a system in accordance with the techniques of the present disclosure.

A data storage system can use a log for recording user or client write I/Os. An entry from the log (sometimes referred to as the UD (user data) log) of user or client writes can be an update, such as a client write I/O, to a logical address (e.g., LUN or logical device and LBA or logical block address) which writes an updated UD page or block of content to the logical address. The log can be stored persistently. In response to receiving a write I/O from a host or other client, a corresponding entry can be created and stored persistently in the log, and then an acknowledgement regarding completion of the write I/O can be returned to the host or other client that sent the write I/O.

At a later point in time, the entry can be flushed from the log. Flushing the entry from the log can include writing the updated UD page of the entry to a backend (BE) storage location on non-volatile storage location. Additionally, flushing the entry from the UD log can include updating and/or creating one or more corresponding metadata (MD) pages of a chain of MD pages which map the logical address to its corresponding BE PD location storing the updated UD page of the logical address. The MD pages of the mapping information can be characterized as a chain forming an access sequence including a top MD page, a mid MD page, a leaf MD page, and a VLB (virtual or virtualized layer block) page, where each page in the foregoing sequence is accessed serially and also in the strict sequential order of the sequence.

In at least one embodiment, the data storage system can maintain the user data or client data as a log structured system (LSS) which can be characterized by typically not performing in place updates which overwrite existing content. In the LSS for user data, flushing one or more UD log entries of updates to a UD page stored at an existing physical storage location (e.g., on BE PDs) can include determining an updated version of the UD page and storing the updated version of the UD page at a new physical storage location that is different from the existing physical storage location. Thus, the physical storage location of the UD page (as stored persistently on the BE PDs) can move or change each time an updated version of the UD page is written to the BE PDs, where such updated version of the UD page can be the result of flushing one or more entries from the UD log which update the same UD page, and then persistently storing the updated version of the UD page on the BE PDs.

A storage system can perform deduplication in connection with deduplicating user data or content stored on the storage system. Consistent with discussion above, flushing a log entry of a recorded write operation can be characterized as including a late-binding or mapping of a logical address to a corresponding physical storage location storing content of the logical address. Generally, the late-binding or mapping can be an expensive operation that can add considerable latency to flush processing of the log entry. For example, there can be costs in terms of processing and resources in connection with obtaining locks on necessary logical and virtual resources where a virtual resource can include a VLB page of a virtual mapping layer. Additionally, the costs can include processing time associated with contention for such logical and/or virtual resources.

In at least one embodiment, data deduplication can be performed in connection with flushing the log entry. The late-binding or mapping process of flushing can include binding a flush set of dirty (e.g., updated or modified) pages of data or content to corresponding logical addresses, where the dirty pages can include both unique data and duplicate data or content. In at least one embodiment, the late-binding process can include MD changes that i) bind a logical address storing a duplicate data page of the flush set to an existing virtual location (e.g., existing VLB entry) associated with an existing stored data page, and ii) bind a logical address storing a unique data page of the flush set to a new virtual location associated with the newly stored unique data page. In at least one embodiment, the VLB entries of duplicate data stored at multiple logical addresses can be characterized as shared and can be used by multiple threads, such as multiple flush threads, that can execute concurrently. In at least one embodiment, a newly created VLB entry of unique data can be characterized as local and currently not shared by multiple logical addresses or other threads since the unique data is initially being stored and accessed only by the particular flush thread flushing a corresponding log entry of a recorded write I/O that writes the unique data.

Some approaches that can be used in connection with performing data deduplication during flushing can be inefficient and/or can result in higher than desirable latency.

For example, one late-binding approach in connection with committing and binding duplicate data and unique data of the same flush set can include two different separate transactions with i) one transaction (e.g., the duplicate data commit transaction) for committing and binding duplicate data pages of the flush set, and ii) a second separate transaction (e.g., the unique data commit transaction) for committing and binding unique data pages of the same flush set. Each of the foregoing two transactions can include locking and performing updates to multiple different MD page types, such as mixing updates to shared MD leaf and shared VLB pages, in the same transaction generally resulting in larger transactions with more complex locking dependencies. In some cases, unique data and duplicate data of the same flush set can be written to consecutive logical addresses where the same MD page can be utilized and/or updated by the two separate transactions without consideration of whether the two transactions utilize or update the same MD. Thus there can be redundant locking and/or updating of the same MD page in both transactions. Additionally due to dependencies between the two transactions that write to consecutive logical addresses, there can be contention between the two transactions for the same resources, such as the same MD page, such that the two transactions are performed serially so that the incurred latency is based, at least in part, on the sum of the latency of the two transactions.

In at least one approach, there can be excessive locking of shared MD pages used in connection with deduplicated data where such shared MD pages can be locked, for example, in connection with determining whether candidate data pages are duplicates of existing target pages and then when committing the above-noted deduplicate data commit transaction. The foregoing locking contention of shared MD pages, such as shared VLB pages in connection with deduplicated data, can be even more severe i) because such MD pages can be shared by multiple flushing threads across multiple nodes of the system and ii) due to the large size of the foregoing transactions and thus increased amount of time that the shared MD pages can be held or locked by a transaction.

In at least one approach, prior to performing the duplicate data commit transaction, processing can be performed to determine that a data page of the flush set is a duplicate of an existing data page having a corresponding shared VLB entry. The duplicate data commit transaction can subsequently reference and use the corresponding shared VLB entry of the existing data page in connection with its processing. However, in some cases, the shared VLB entry of the existing data page can become stale and thus invalid prior to its use in the duplicate data commit transaction. Put another way, detection processing to determine duplicate data pages can be performed one transaction and then the duplicate data commit transaction can be performed. Suitable locks for the shared VLB entry can be acquired and released separately by the detection processing transaction and the duplicate data commit transaction. Thus there can be a window of time between the detection processing and the duplicate data commit transaction where the shared VLB entry can become stale or invalid subsequent to its use by the detection processing to determining duplicate pages, and prior to its use in the duplicate data commit transaction. For example due to non-deterministic race conditions, the shared VLB entry can be stale or invalid i) if the corresponding existing data page is removed or deleted in the window of time prior to its use in the duplicate data commit transaction, or ii) if the shared VLB entry or page including the VLB shared entry is deleted or moved in the window of time. As a result of the foregoing invalid shared VLB entry, the data page of the flush set can remain in the log as dirty data that can be processed again in connection with another subsequent flush cycle thereby causing a delay and inefficiency in log flushing.

Accordingly described in the following paragraphs are techniques of the present disclosure that can be used in connection with overcoming drawbacks, such as those noted above.

In at least one embodiment, the techniques of the present disclosure provide for omitting or eliminating the above-noted separate transaction (e.g., the duplicate data commit transaction) that commits duplicate data of the flush set, and alternatively integrating the duplicate data commit transaction's processing or workflow efficiently into other transactions and processing. In at least one embodiment, the techniques of the present disclosure include partitioning relevant portions of the duplicate data commit transaction into separate transactions based, at least in part, on the particular MD page types updated. For example in at least one embodiment, first processing of the above-noted duplicate data commit transaction that updates reference counts of VLB entries of one or more VLB pages can be included in one transaction, and second processing of the above-noted duplicate data commit transaction that updates MD leaf entries of one or more MD leaf pages can be included in another different transaction. In contrast, one approach as noted above not using the techniques of the present disclosure may include both the foregoing first and second processing in the same duplicate data commit transaction.

In at least one embodiment, for each data page of the flush set determined to be a duplicate of an existing stored data page, the reference count of a VLB page entry associated with the existing stored data page can be incremented by 1. In at least one embodiment, the techniques of the present disclosure can utilize a first transaction (sometimes referred to as a preprocess transaction) that includes incrementing or updating reference counts of VLB page entries of existing stored data pages corresponding to duplicate data pages of the flush set. Each reference count of a VLB page entry can denote a number of times that a corresponding data page is referenced by a different logical address. Thus the VLB entry reference count can denote the number of times that the same corresponding data page is stored in multiple logical addresses. In at least one embodiment, the first transaction can be performed that includes updating or incrementing the reference counts of all VLB page entries corresponding to deduplicated data pages of the flush set. In at least one embodiment, the first transaction may update only a single type of MD page, VLB pages. In at least one embodiment, the first transaction can update or increment the foregoing reference counts of VLB entries without updating any other metadata.

In at least one embodiment, the first transaction can also include other processing which utilizes or reads VLB entries to obtain existing target data pages used in connection with performing data comparisons to determine whether a dirty data page written by the flush set is a duplicate of any existing target data page.

In at least one embodiment, the unique data commit transaction noted above can be modified or replaced with a unified commit transaction (sometimes referred to as a unified transaction). The unified commit transaction can include binding both the unique data pages and the duplicate data pages of the flush set to corresponding logical addresses. In at least one embodiment, the unified commit transaction can include the above-noted second processing that uses and locks one or more MD leaf pages. In at least one embodiment, each MD leaf page can include MD leaf entries each corresponding uniquely to a single logical address. For a flush set including both unique and duplicate data pages, the unified commit transaction for the flush set may include updating MD leaf entries of one or more MD pages to reference VLB entries associated with both unique and duplicate data pages or blocks. Data pages of the flush set can be determined as unique and not a duplicate of an existing stored target data page. Data pages of the flush set can be determined to be a duplicate of an existing stored target data page. In at least one embodiment, the unified transaction can include performing processing to bind logical addresses to newly allocated and initialized VLB entries corresponding to unique data blocks.

In at least one embodiment, the first transaction that includes updating the reference counts of the VLB entries can be performed prior to the unified commit transaction.

In at least one embodiment of the first transaction, updating the reference counts of VLB entries can be performed i) after determining candidate target data pages, if any, for each of the data pages of the flush set, and ii) prior to performing a full data comparison of each candidate target data page to a corresponding data page of the flush set. As a variation in at least one embodiment of the first transaction, updating the reference counts of VLB entries can be performed i) after determining candidate target data pages, if any, for each of the data pages of the flush set, and ii) also after performing a full data comparison of each candidate target data page to a corresponding data page of the flush set.

In at least one embodiment, each candidate target data page can be an existing data page stored on the storage system which has a corresponding hash value matching a calculated hash value of a data page of the flush set but for which a full data comparison has not yet been performed. In at least one embodiment, the full data comparison of the candidate target data page and the data page of the flush set can be performed to determine whether the foregoing two data pages are identical or duplicate in terms of content. In at least one embodiment, the full data comparison can be performed to account for any potential hash collision where a hash function used generates the same hash value for two non-identical data pages.

In at least one embodiment, once the reference count of an existing VLB entry corresponding to an existing target data block or page is updated and thus committed by the first or preprocess transaction, the corresponding existing target data block or data page associated with the VLB entry can be characterized as protected and/or secured in that it will not be deleted prior to its subsequent use or reference in connection with other processing of the unified transaction, such as in connection with binding a logical address to the corresponding target data block to denote that the logical address stores deduplicated content. In at least one embodiment, a stored data page such as a target data page can be deleted or removed if its reference count goes to 0. In this case using the techniques of the present disclosure in at least one embodiment, the reference count has been further incremented by 1 in the first or preprocess transaction prior to binding the target data page to a corresponding logical address determined to store a duplicate of the target data page. In this manner, the target data block and it's corresponding VLB entry cannot be removed or deleted (e.g., by having the reference count go to 0) even if a current MD leaf entry of another logical address also referencing the VLB entry is updated to no longer store the target data block thereby resulting in decrementing the reference count by 1. Even with such a decrement applied to the reference count, the reference count corresponding to the target data block is guaranteed to remain greater than zero.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, ISCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device or other non-volatile storage device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
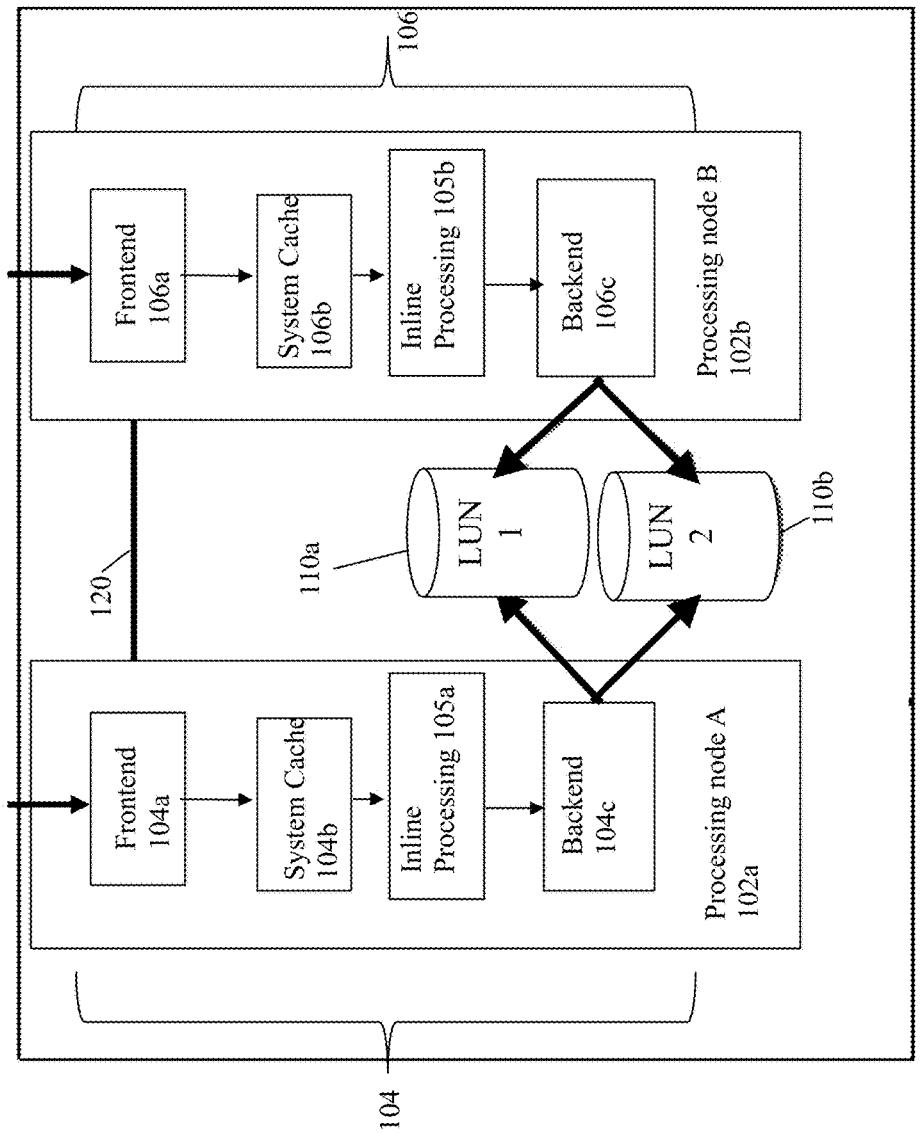
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
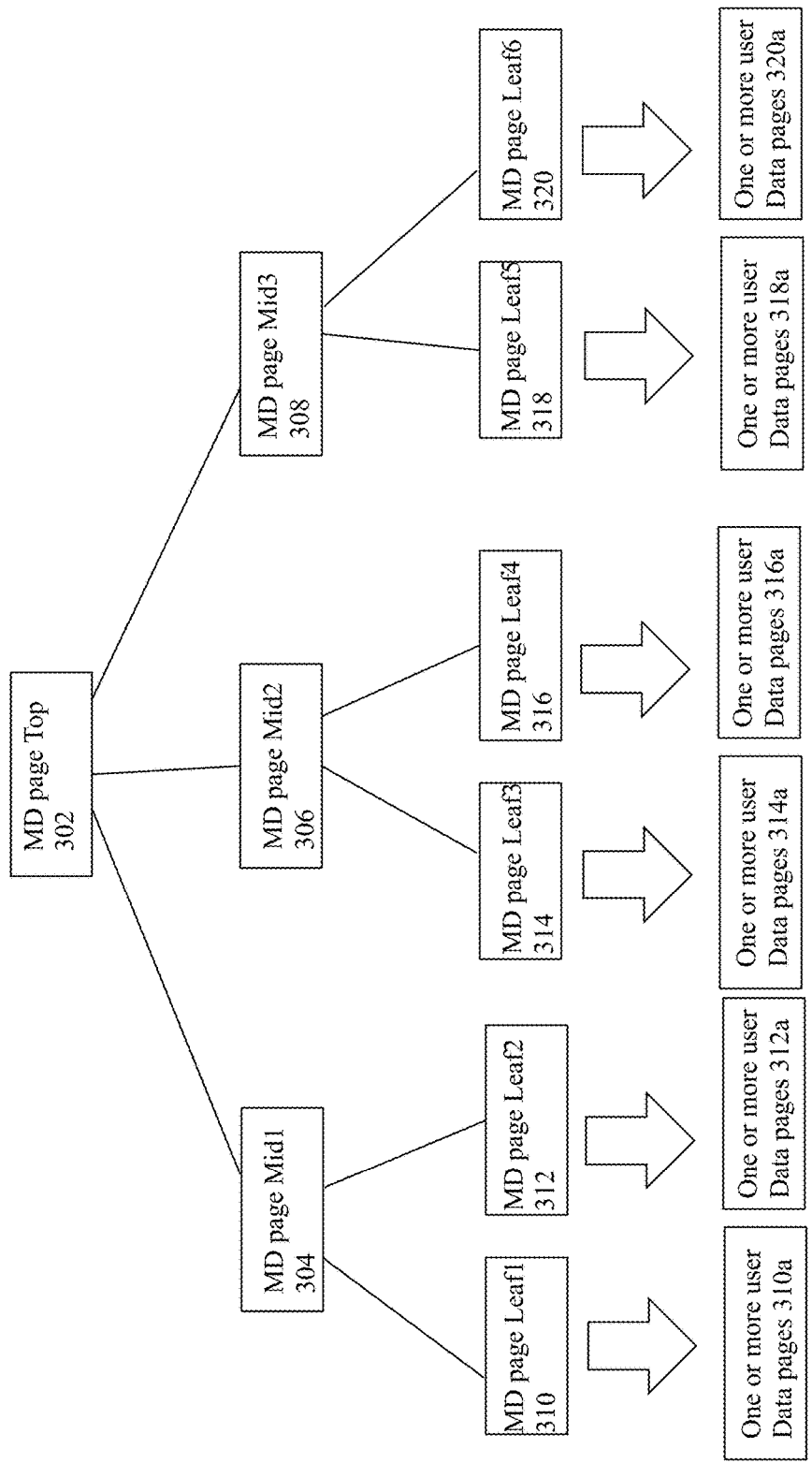
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log such as a user data (UD log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
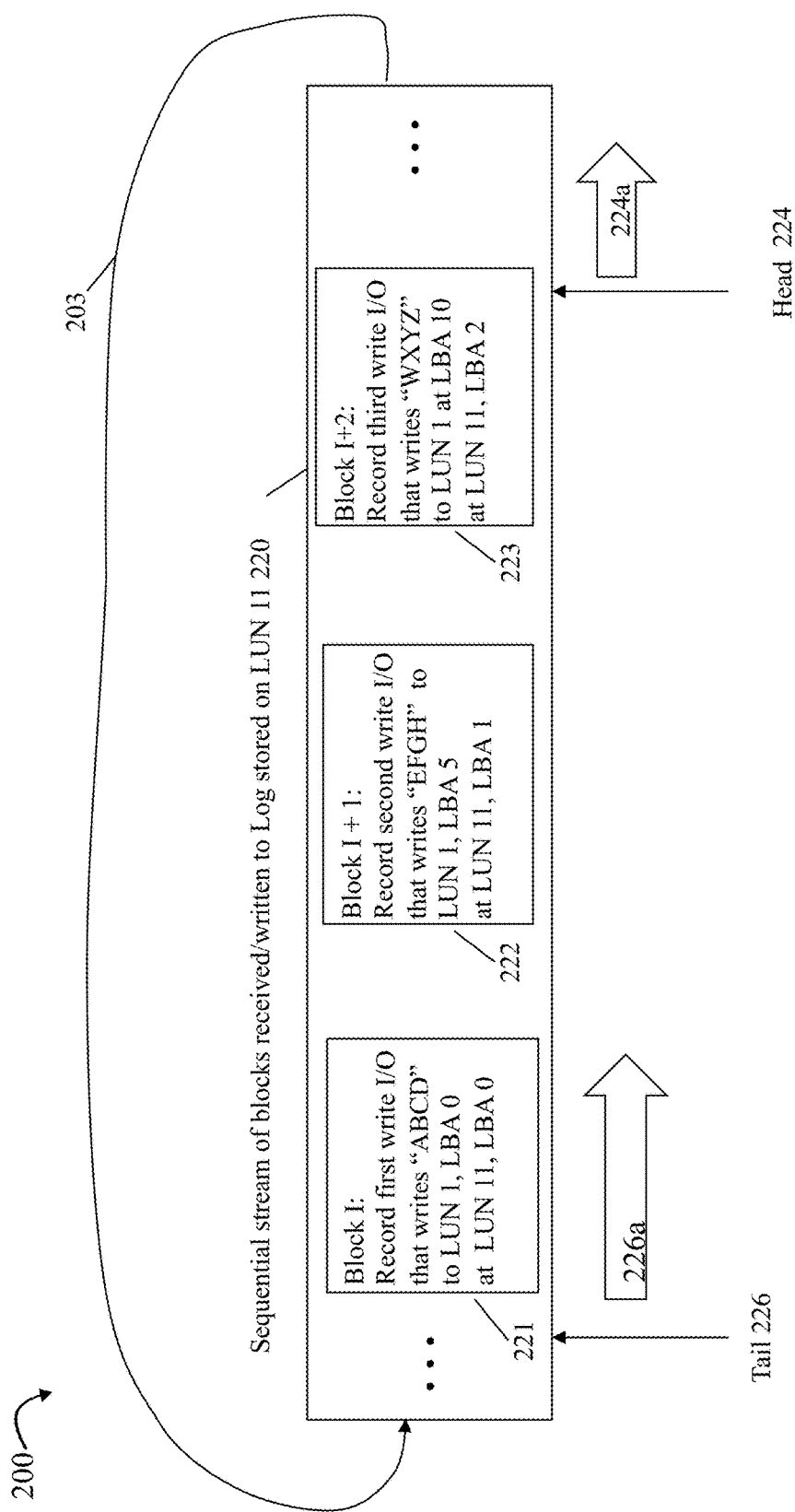
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system.

The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
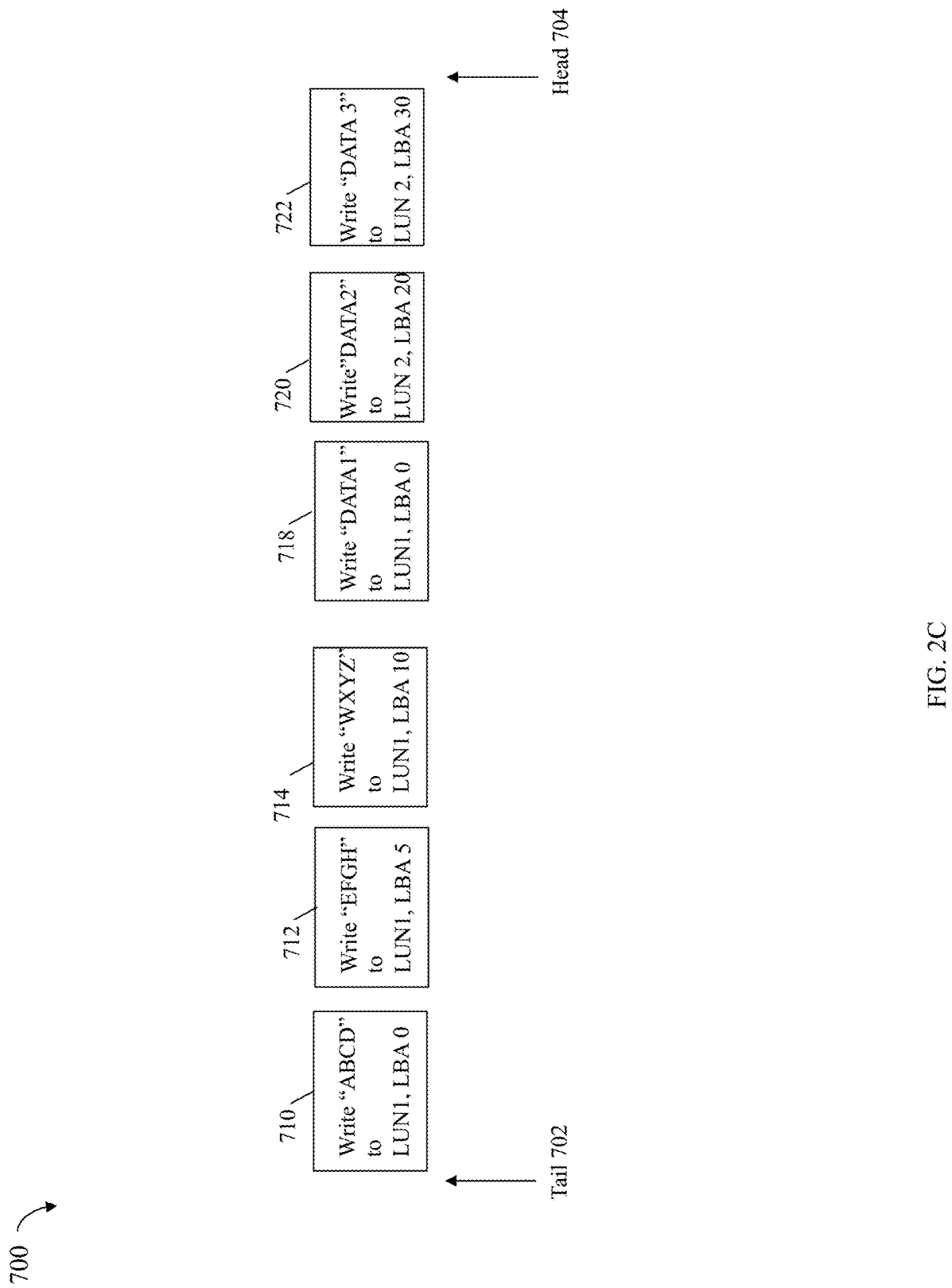

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
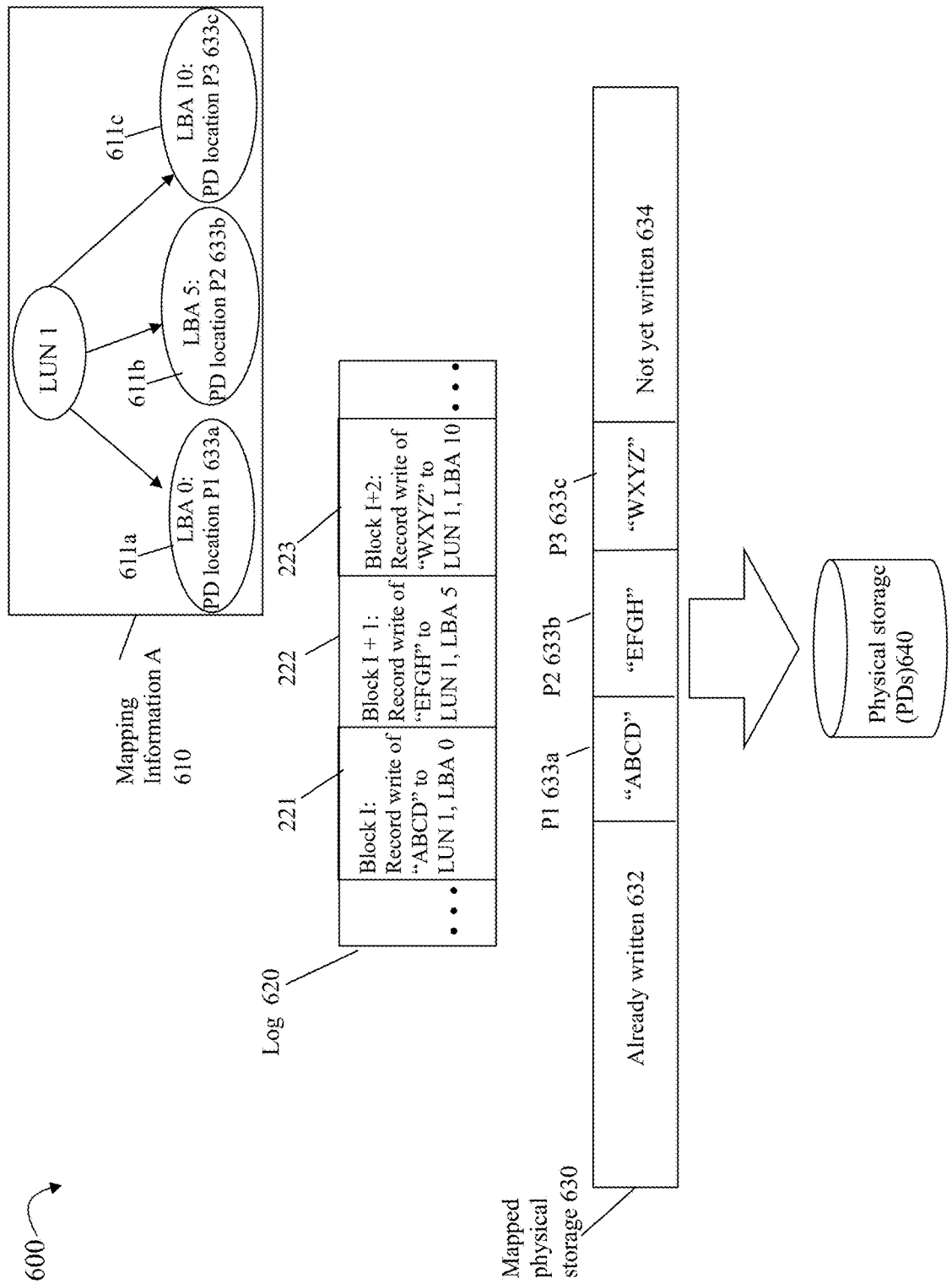

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels-a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
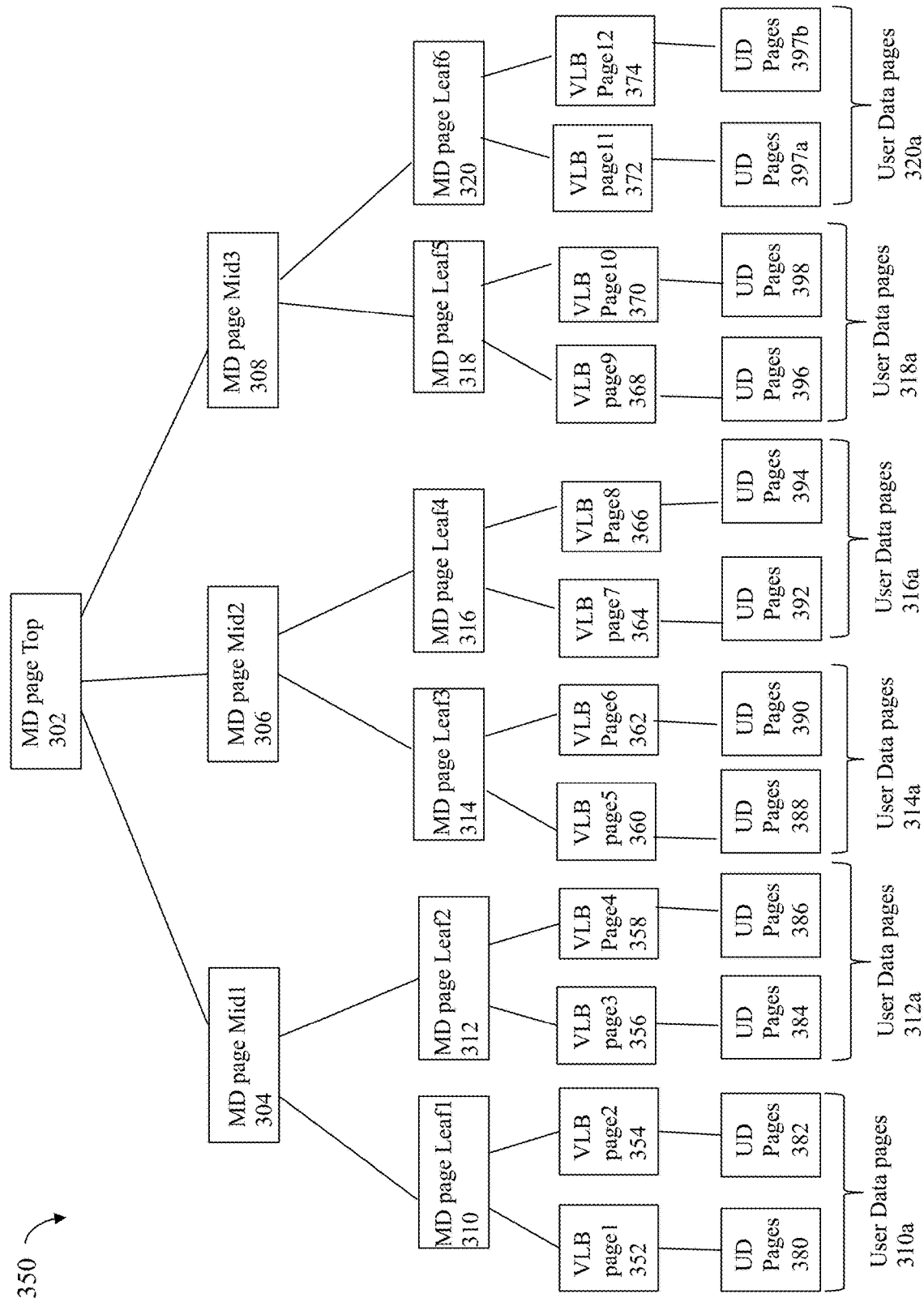

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
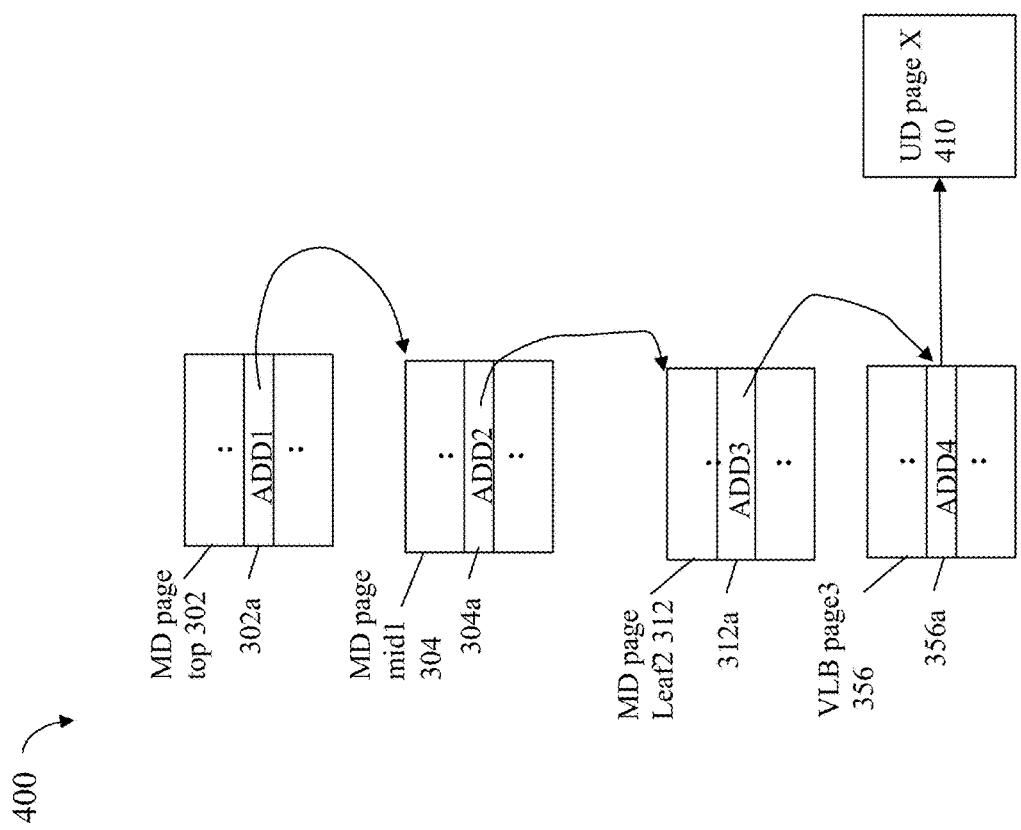

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1

304. In at least one embodiment, the starting entry 302*a* in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302*a* having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302*a*. If the MD page 302 is already in cache, the cached copy can be used to obtain the address or pointer ADD1 from the location 302*a*. The address or pointer ADD1 of location 302*a* can then be used to identify the particular mid level MD page, such as MD page mid1 304, that is accessed next in the sequence.

Continuing with the example 400, the MD page mid1 304 can be accessed where the location 304*a* is read to obtain the address or pointer ADD2 from location 304*a*. In at least one embodiment, the particular entry or offset 304*a* of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304*a*. The address or pointer ADD2 identifies the MD page leaf 2 312. If the MD page 312 is not already in cache, the on-disk copy of the MD page 312 on a PD can be read to obtain the content of location 312*a*. In at least one embodiment, the particular desired entry or offset 312*a* of the MD leaf2 page 312 can be determined based on the logical address being mapped. The location 312*a* of the MD page leaf2 312 can be accessed and read to obtain the address or pointer ADD3 from location 312*a*. The address or pointer ADD3 can then be used to identify a particular entry of a VLB page, such as the entry 356*a* of the VLB page3 356, that is next accessed in the sequence. Thus, ADD3 can denote the location or address of the entry 356*a* in the VLB page 3 356.

If the VLB page 356 is not already in cache, the on-disk copy of the VLB page 356 on a PD can be read to obtain the content of location 356*a*. The location 356*a* of the VLB page 3 356 can be accessed and read to obtain the address or pointer ADD4 from the location 356*a*. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
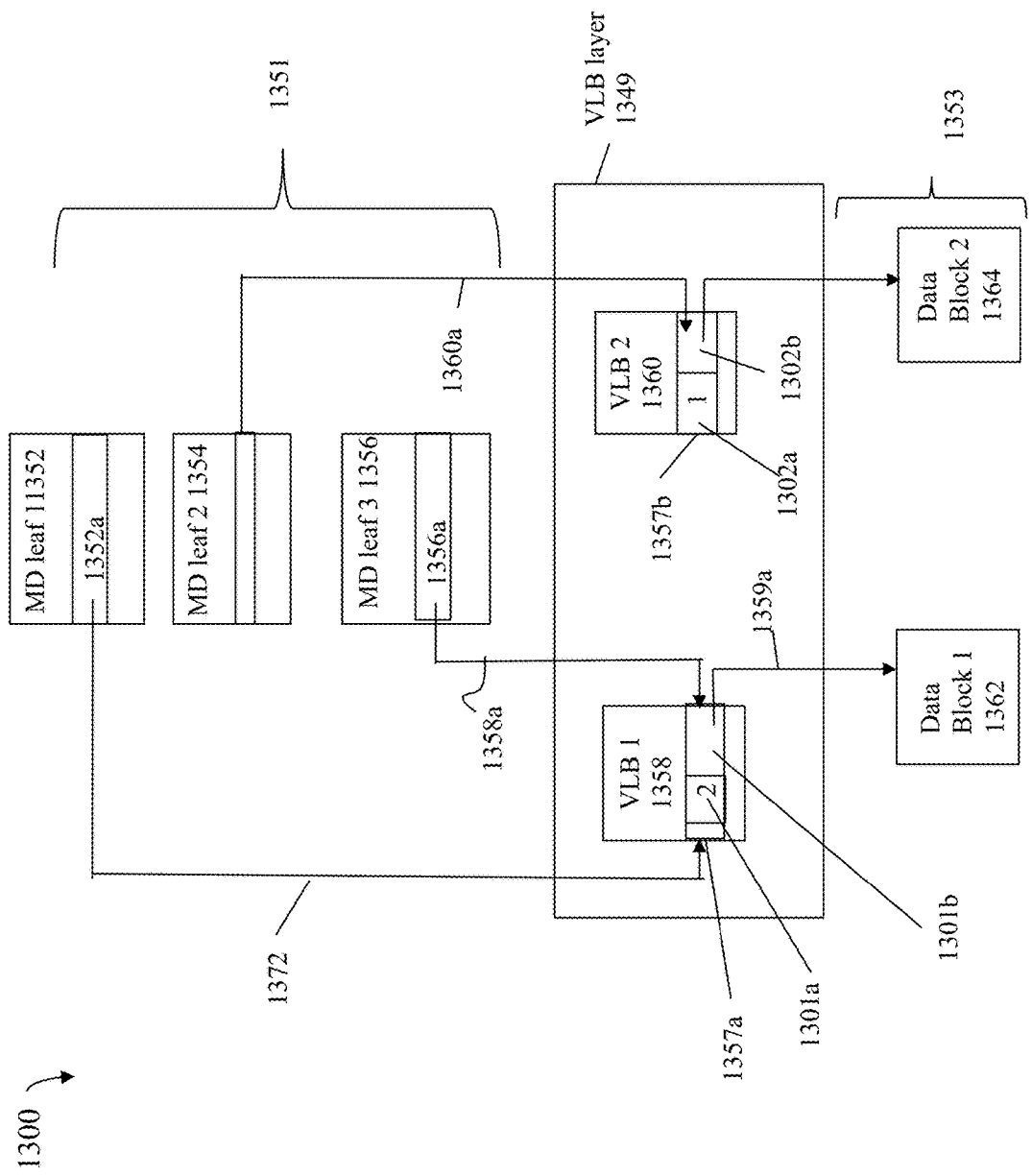

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357*a* of the VLB 1358. The two MD leaf nodes 1352 and 1356 both referencing the same data block 1362 indirectly through use of the same VLB entry 1357*a* can be a mapping resulting from data deduplication processing. In the example 1300, MD leaf node 1354 points to the entry 1357*b* of the VLB 1360 whereby the entry 1357*b* of the VLB2 1360 then further references or points to the data block 1364. The data blocks 1362, 1364 can denote user data blocks as described herein.

The element 1358*a* denotes a pointer to, or address of, the entry 1357*a* in the VLB 1358 used in connection with obtaining the data block 1362 stored on a particular LUN and LBA of the LUN. The pointer 1358*a* can be used as the virtual or indirect pointer in connection with obtaining the data block 1362. In at least one embodiment, the VLB 1358 can be a VLB page or node as described herein. Thus, in such an embodiment, the virtual or indirect pointer 1358*a* can be a pointer to the entry 1357*a* of the VLB structure 1358, where the entry 1357*a* can further include fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1372 denotes a pointer to, or address of, the entry 1357*a* in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357*a* of the VLB structure 1358, where the entry 1357*a* can further include the fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1360*a* denotes a pointer to, or address of, the entry 1357*b* in the VLB 1360 used in connection with obtaining the data block 1364 stored on a particular LUN and LBA of the LUN. The pointer 1360*a* can be used as the virtual or indirect pointer in connection with obtaining the data block 1364. Thus, in such an embodiment, the virtual or indirect pointer 1360*a* can be a pointer to the entry 1357*b* of the VLB structure 1360, where the entry 1357*b* can further include the fields 1302*a* and 1302*b*. The field 1302*b* can be a pointer to, or address of, the user data block 1364. The field 1302*a* can be a reference count or counter indicating the number of instances of, or references to, the particular data block 1362 (e.g., data block pointed to by 1302*b*).

The reference count 1301*a* can be initialized to 1 when a first or initial instance of the associated data block 1362 is stored. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

The reference count 1302a can be initialized to 1 when a first or initial instance of the associated data block 1364 is stored. In this example, the reference 1302a is 1 indicating that there is 1 instance of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data. In particular, the MD leaf 1354 references or points (1360a) to the VLB entry 1357b associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

An embodiment of a data storage system in accordance with the techniques of the present disclosure may perform different data processing operations or services on stored user data. For example, the data storage system may perform one or more data reduction operations, such as data deduplication. Such data reduction operations attempt to reduce the amount of storage needed for storing data on non-volatile back-end storage devices (e.g., PDs) with the goal of reducing the cost per unit of storage consumed (e.g., dollar cost per GB of storage). Generally, data deduplication techniques are known in the art and any suitable such technique may be used in an embodiment in accordance with techniques herein. In at least one embodiment in accordance with techniques of the present disclosure, data deduplication processing performed may include digest or hash value computation using an algorithm such as, for example, based on the SHA-256 cryptographic hashing algorithm. More generally, an embodiment can use any suitable hashing algorithm and is not limited to the foregoing. Data deduplication generally refers to removing redundant or duplicate data portions. Data deduplication techniques may include looking for duplicate data blocks whereby only a single instance of the data block is retained (stored on physical storage) and where pointers or references may be used in connection with duplicate or redundant copies (which reference or identify the single stored instance of the data block).

Figure 7:
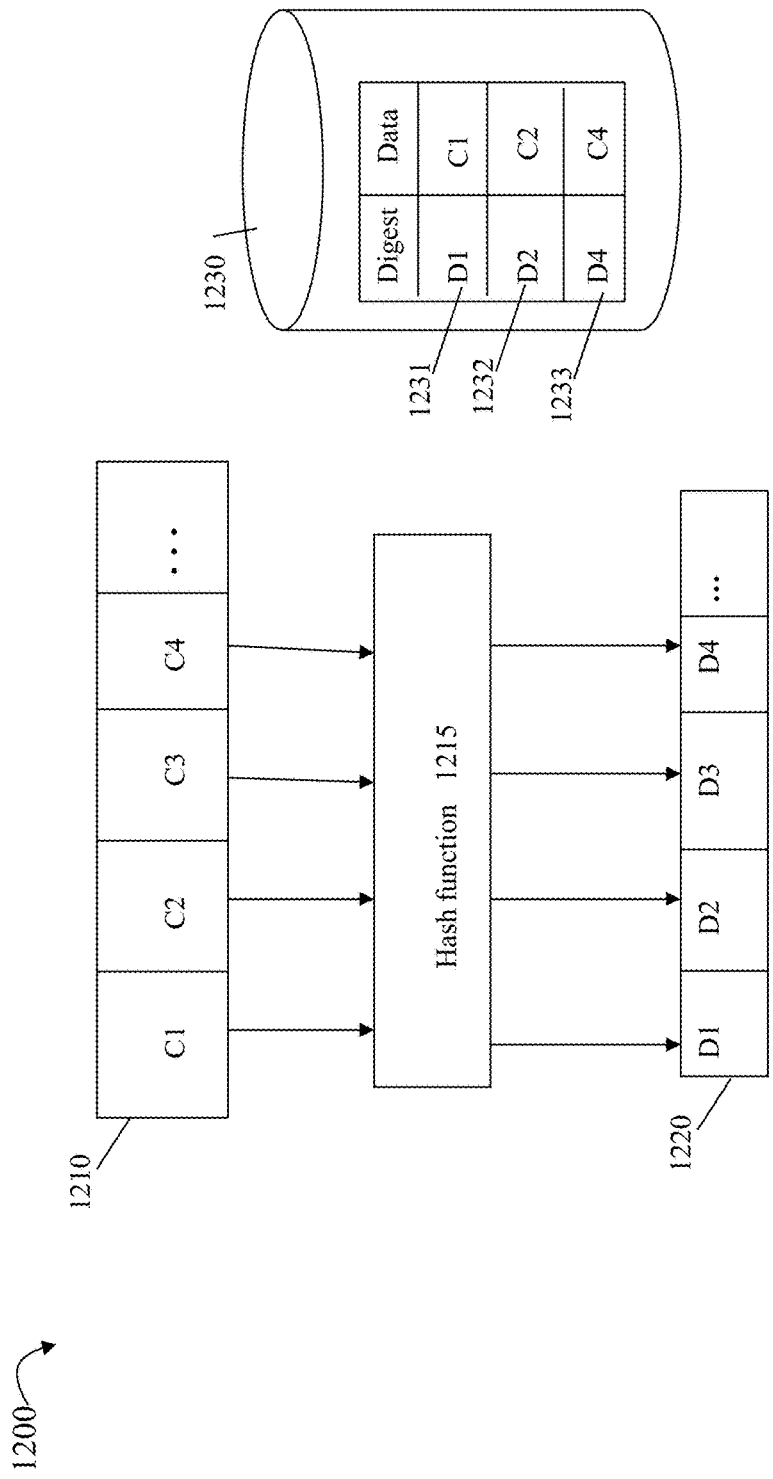
FIGS. 7 and 8 illustrate a deduplication data store and processing that can be performed in connection with deduplication processing in at least one embodiment in accordance with the techniques of the present disclosure.

Referring to FIG. 7, shown is an example 1200 illustrating processing that may be performed in connection with data deduplication processing in an embodiment in accordance with techniques of the present disclosure. The element 1210 may denote the original data being written or stored on back-end non-volatile storage. The original data may be partitioned into multiple data blocks C1, C2, C3, C4 and the like. In at least one embodiment and for purposes of illustration, the data blocks may all be the same size where the size may vary with embodiment. Each block is provided as an input to hash function 1215. As noted above, in at least one embodiment, the hash function 1215 may be the SHA-256 hashing algorithm, or more generally, any suitable cryptographic, or non-cryptographic hashing function. For each block of 1210, the hash function 1215 may perform processing and generate, as an output, a hash value, hash or digest derived from the block 2110. The element 1220 includes hashes D1, D2, D3, D4, and the like, where a corresponding different one of the hashes DN is generated for each one of the blocks CN (where "N" is an integer denoting the block and associated hash value generated for that block). For example, D1 is the hash generated for C1, D2 is the hash generated for C2, D3 is the hash generated for C3, and so on. Generally, a hash function 1215 is selected which has an acceptably low probability of a "hash collision" of generating the same digest or hash value for two different blocks. The strength of the hash function 1215 may be measured by the unlikelihood of a collision occurring where two different input blocks of data produce the same hash. The strength increases with the bit length of the hash value, hash or digest. Thus, if two blocks, such as C1 and C3, have the same hashes whereby D1=D3, then blocks C1 and C3 match (e.g., are identical matching data blocks). If two blocks, such as C1 and C4, have different hashes whereby D1 does not equal D4, then blocks C1 and C4 do not match (e.g., are different or non-matching data blocks). In cases where two matching or identical blocks have the same hash, only a single copy of the data block is stored on backend non-volatile physical storage of the data storage system. The single stored instance of the data block may be referenced using a pointer, handle, the hash of the block, and the like.

The element 1230 of the FIG. 7 may denote the data store, such as a data base (DB) used to store data blocks. In this example, as noted above, assume blocks C1 and C3 are the same with remaining blocks C2 and C4 being unique. In at least one embodiment, the data store 1230 may be organized and managed using a data structure, such as a hash table. In at least one embodiment, computed hashes, or portions thereof, may be used as an index into the hash table where the single unique instances of data blocks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the block of data may be mapped by hash function 1215, and thus by the block's hash, to a particular entry in the table at which the block of data is stored. To further illustrate, the hash function 1215 may be used to generate a hash value, hash or digest for a particular data block. The hash is then further mapped (e.g., such as by another mathematical function, using particular portions of the hash, and the like) to a particular index or entry of the hash table. The particular mapping used to map the hash to a corresponding table entry varies, for example, with the hash and the size of hash table.

When storing a new data block, such as C1, its hash may be mapped to a particular hash table entry 1231 whereby if the table entry is null/empty, or otherwise does not already include a data block matching C1, then C1 is stored in the table entry along with its associated hash D1 (this is the first time block C1 is recorded in the data store 230). Otherwise, if there is already an existing entry in the table including a data block matching C1, it indicates that the new data block is a duplicate of an existing block. In this example as noted above, processing is performed for C1, C2, and C4 respectively, where entries 1231, 1232, and 1233 are added since there are no existing matching entries in the hash table. When processing block C3, as noted above, C3 has a hash D3 matching D1 whereby C3 (and thus D3) maps to entry 231 of the hash table already including a matching block C1 (so no additional data block is added to 1230 for C3 since C3 is determined as a duplicate of C1). In connection with representing a particular file or other storage entity including multiple duplicate occurrences of a particular block such as C3, the single instance or copy of the data may be stored in 1230. Additionally, a handle or reference, such as identifying the hash table entry 1231, its hash, and the like, may be used to reference the single instance or copy of the data storage in 1230. When reconstructing or restoring data to its original form, the handle or reference into the hash table for block C3 may be used to obtain the actual block C3 of data from 1230.

In at least one embodiment with reference back to FIG. 2A in connection with the inline processing layers 105a-b, prior to storing the original data on the physical storage 110a, 110b, data deduplication processing may be performed that converts the original data (as stored in the system cache prior to inline processing) to a resulting form (that may include deduplicated portions) which is then written to physical storage 110a, 110b. In at least one embodiment, when deduplication processing determines that a portion (such as a block) of the original data is a duplicate of an existing data portion already stored on 110a, 110b, that particular portion of the original data is stored in its deduplicated form.

In connection with a read operation to read a block of data, a determination is made as to whether the requested read data block is stored in its original form (in system cache 104b or on physical storage 110a, 110b), or whether the requested read data block was previously deduplicated. If the requested read data block (which is stored in its original non-deduplicated form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block was previously deduplicated, the read data block is recreated and stored in the system cache in its original form so that it can be returned to the host. Thus, requested read data stored on physical storage 110a, 110b may be stored in a deduplicated form as noted above where processing is performed by 105a to restore or convert the deduplicated form of the data to its original data form prior to returning the requested read data to the host.

When the processor, such as of a processing node 102a or 102b, performs processing, such as in connection with the inline processing 105a, 105b as noted above, data may be loaded from the main memory and/or other lower cache levels into its CPU cache. In particular, inline data deduplication (ILD) may be performed as part of the inline processing 105a, 105b. In at least one embodiment, the size of a data block, page or portion processed by ILD may be 4096 bytes or 4K bytes in size.

In at least one embodiment in connection with deduplication, a deduplication data store (dedupe data store or DB) can be used such as described in connection with the element 1230 of the FIG. 7 having a hash table organized by indices which are randomly distributed and approximate a uniform distribution.

Data deduplication may be performed at the data block, page or portion level of granularity, for example, where each entry of the data store 1230 is mapped to a single unique data block. As sometimes used herein, a target data block, target block or dedupe target refers to a single unique instance of a data block currently stored in the dedupe data store 1230. Also sometimes used herein, reference is made to a candidate data block, candidate block or dedupe candidate that refers to a data block for which deduplication processing is performed with the goal of eliminating duplicate candidate blocks from being stored. A hash may be computed for the candidate data block using a hash function whereby the hash identifies the candidate data block with a high level of uniqueness, even though the hash is typically much smaller than the candidate data block itself. Hashes thus enable data block matching between the candidate and target data blocks in the dedupe data store 1230 to proceed quickly and efficiently. Consistent with discussion above, for each hash in an entry of the dedupe data store 1230, the data store 1230 may store a pointer that leads to a stored version of the respective target data block. To perform deduplication on a particular candidate block, a storage system computes a hash of the candidate block and searches the dedupe data store 1230, or a cached version thereof, for an entry that matches the computed hash. In at least one embodiment, if a match is found, the storage system may then perform a full data comparison that compares the actual content of the target block with the content of the candidate block to ensure the target and candidate data blocks having matching content. If the target and candidate data blocks have matching content, processing may arrange metadata of the candidate block to point to the target data block that the dedupe data store 1230 has associated with the matching hash. In this manner, a duplicate copy of the data block is avoided. In at least one embodiment, the foregoing data comparison of the target block to the candidate block can be performed due to the potential hash collisions that may occur where the hash function or algorithm can potentially generate the same hash value for two different data blocks.

The term candidate can be used in connection with other contexts herein in addition to the above-noted candidate or current data block for which deduplication is performed. For example, an existing stored data block or page can be referred to as a dedupe target. Consistent with discussion herein in at least one embodiment, a first hash value can be determined for a candidate data block for which deduplication processing is performed. Candidate dedupe targets can be found with respect to searching the dedupe data store for corresponding hashes that match the first hash value. Each of the candidate dedupe targets can represent a potential match to the candidate data block that needs to be further considered in connection with performing an actual data comparison between the candidate data block and the candidate dedupe target. Consistent with discussion elsewhere herein, for each candidate dedupe target having a corresponding hash value matching the first hash value, a data comparison can be performed between the candidate dedupe target and the candidate dedupe target to determine whether the foregoing match. If so, then the candidate data block can be determined to be a duplicate of the matching candidate dedupe target, and otherwise the candidate data block is determined not to be a duplicate of the matching candidate dedupe target.

Figure 8:
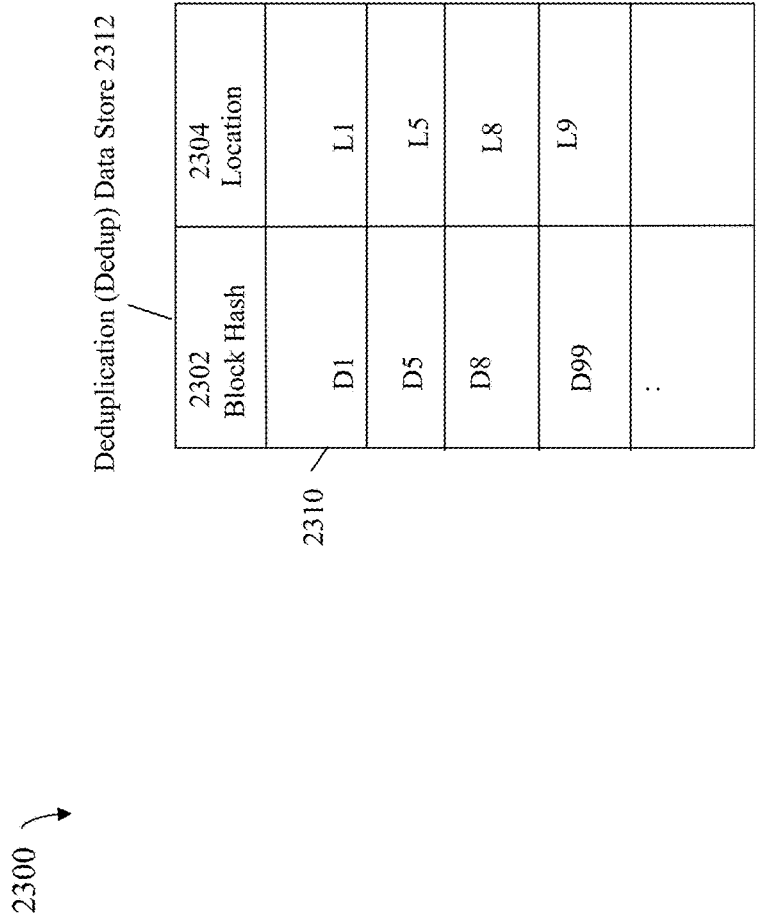

Referring to FIG. 8, shown is an example 2300 of the deduplication (dedupe) data store 2312 that may be used in an embodiment in accordance with the techniques of the present disclosure. The dedupe data store 2312 is configured to store hashes of the target blocks along with associated information. The dedupe data store 2312 may include the following columns of information: the data block hash 2302 and the location 2304. Each entry or row of the dedupe data store 2312 may include information for a different single target block.

In at least one embodiment, the entire dedupe data store 2312 may be stored on persistent storage, such as BE non-volatile storage, where the entire dedupe data store 2312 may include information for each data block stored on the BE non-volatile storage. In at least one embodiment, at least a portion of the dedupe data store 2312 may be stored in a cache for use in performing deduplication processing.

In at least one embodiment, the block hashes of the column 2302 may be computed using a hash function, such as a cryptographic hash function mentioned above, for each of the target data blocks. The location 2304 may take various forms. The location 2304 may generally directly or indirectly identify a location where the content of a target data block is stored. For example, the location 2304 may point to metadata that is further mapped to the data block, such as to a persistently stored version of the data block as stored on non-volatile physical storage, such as on one of the BE PDs 16a-n of FIG. 1. In this instance, the content of the target block may be obtained indirectly using the metadata. In at least one embodiment, the location 2304 can be a pointer to, address of, or reference to, a VLB entry, where the VLB entry can further include a physical address PA of a storage location on BE non-volatile storage, where PA can denote the physical address or location of stored content or user data (UD). For example with reference to entry 2310, D1 (2302) can denote the hash of a stored UD page of content C1, and L1 (2304) can denote or reference the location of where C1 is stored on BE non-volatile storage. In at least one embodiment, L1 can be a pointer to, address of, or reference to, a VLB entry as noted above. Thus in at least one embodiment, L1 can be an indirect pointer or indirect address of where C1 is stored. In at least one embodiment with reference back to FIG. 6, assume that C1 is stored in 1362 where 1362 has a corresponding physical address PA1 on BE non-volatile storage. L1 can be a pointer to, reference to, or address of, the VLB entry 1357a.

When performing deduplication processing for a candidate block, at least one embodiment of the techniques herein may include computing the hash for the candidate block and comparing the computed hash for the candidate to the hash entries in column 1302 of the dedupe data store 1312 to determine whether there is a match between the computed block hash for the candidate and a hash of the column 1302 of an entry for a target block of the dedupe data store 1312. If a match is found, processing may then be performed to compare (e.g., byte-by-byte) the content of the candidate block with the content of the target block having the matching entry of the dedupe data store and ensure the actual data contents of the candidate and target blocks match. If the actual contents of the candidate and target blocks match, processing then proceeds to store the candidate block as a full deduplicated block (e.g., duplicate of the target block).

Consistent with discussion elsewhere herein, for a candidate block that is found to be unique (e.g., whereby there is no matching target block in the dedupe data storage 1312), the candidate block may be stored as a new target block and processing may include persistently storing the content of the new target block and additionally storing an entry with the hash for the new target block in the dedupe data store 1312. In at least one embodiment, such processing for the new target block may include creating a corresponding entry for the new target block in the dedupe data store 1312 including the block hash 1302 and location 1304 for the new target block.

In at least one embodiment, blocks of content (e.g., UD) stored on BE non-volatile storage can be stored in its corresponding compressed form. Thus in such an embodiment, processing can include compressing the original data block to obtain a corresponding compressed form of the original data block, and then persistently storing the compressed form. In a similar manner, when reading a data block from BE non-volatile storage where the data block is stored in its compressed form, processing can include: reading the compressed form of the data block from BE non-volatile storage, decompressing the compressed form to obtain the uncompressed form of the data block (e.g., the original data block), and the using the uncompressed form such as to service a read operation.

Consistent with discussion herein, the data storage system can use a log for recording user or client write I/Os. An entry from the log (sometimes referred to as the UD (user data) log) of user or client writes can be an update, such as a client write I/O, to a logical address (e.g., LUN or logical device and LBA or logical block address) which writes an updated UD page or block of content to the logical address. The log can be stored persistently. In response to receiving a write I/O from a host or other client, a corresponding entry can be created and stored persistently in the log, and then an acknowledgement regarding completion of the write I/O can be returned to the host or other client that sent the write I/O.

At a later point in time, the entry can be flushed from the log. Flushing the entry from the log can include writing the updated UD page of the entry to a backend (BE) storage location on non-volatile storage location. Additionally, flushing the entry from the UD log can include updating and/or creating one or more corresponding metadata (MD) pages of a chain of MD pages which map the logical address to its corresponding BE PD location storing the updated UD page of the logical address. The MD pages of the mapping information can be characterized as a chain forming an access sequence including a top MD page, a mid MD page, a leaf MD page, and a VLB (virtual or virtualized layer block) page, where each page in the foregoing sequence is accessed serially and also in the strict sequential order of the sequence.

In at least one embodiment, the data storage system can maintain the user data or client data as a log structured system (LSS) which can be characterized by typically not performing in place updates which overwrite existing content. In the LSS for user data, flushing one or more UD log entries of updates to a UD page stored at an existing physical storage location (e.g., on BE PDs) can include determining an updated version of the UD page and storing the updated version of the UD page at a new physical storage location that is different from the existing physical storage location. Thus, the physical storage location of the UD page (as stored persistently on the BE PDs) can move or change each time an updated version of the UD page is written to the BE PDs, where such updated version of the UD page can be the result of flushing one or more entries from the UD log which update the same UD page, and then persistently storing the updated version of the UD page on the BE PDs.

Also consistent with discussion herein, the storage system can perform deduplication in connection with deduplicating user data or content stored on the storage system. Consistent with discussion above, flushing a log entry of a recorded write operation can be characterized as including a late-binding or mapping of a logical address to a corresponding physical storage location storing content of the logical address. Generally, the late-binding or mapping can be an expensive operation that can add considerable latency to flush processing of the log entry. For example, there can be costs in terms of processing and resources in connection with obtaining locks on necessary logical and virtual resources where a virtual resource can include a VLB page of a virtual mapping layer. Additionally, the costs can include processing time associated with contention for such logical and/or virtual resources.

In at least one embodiment, data deduplication can be performed in connection with flushing the log entry. The late-binding or mapping process of flushing can include binding a flush set of dirty (e.g., updated or modified) pages of data or content to corresponding logical addresses, where the dirty pages can include both unique data and duplicate data or content. In at least one embodiment, the late-binding process can include MD changes that i) bind a logical address storing a duplicate data page of the flush set to an existing virtual location (e.g., existing VLB entry) associated with an existing stored data page, and ii) bind a logical address storing a unique data page of the flush set to a new virtual location associated with the newly stored unique data page. In at least one embodiment, the VLB entries of duplicate data stored at multiple logical addresses can be characterized as shared and can be used by multiple threads, such as multiple flush threads, that can execute concurrently. In at least one embodiment, a newly created VLB entry of unique data can be characterized as local and currently not shared by multiple logical addresses or other threads since the unique data is initially being stored and accessed only by the particular flush thread flushing a corresponding log entry of a recorded write I/O that writes the unique data.

Some approaches that can be used in connection with performing data deduplication during flushing can be inefficient and/or can result in higher than desirable latency.

For example, one late-binding approach in connection with committing and binding duplicate data and unique data of the same flush set can include two different separate transactions with i) one transaction (e.g., the duplicate data commit transaction) for committing and binding duplicate data pages of the flush set, and ii) a second separate transaction (e.g., the unique data commit transaction) for committing and binding unique data pages of the same flush set. Each of the foregoing two transactions can include locking and performing updates to multiple different MD page types, such as mixing updates to shared MD leaf and shared VLB pages, in the same transaction generally resulting in larger transactions with more complex locking dependencies. In some cases, unique data and duplicate data of the same flush set can be written to consecutive logical addresses where the same MD page can be utilized and/or updated by the two separate transactions without consideration of whether the two transactions utilize or update the same MD. Thus there can be redundant locking and/or updating of the same MD page in both transactions. Additionally due to dependencies between the two transactions that write to consecutive logical addresses, there can be contention between the two transactions for the same resources, such as the same MD page, such that the two transactions are performed serially so that the incurred latency is based, at least in part, on the sum of the latency of the two transactions.

In at least one approach, there can be excessive locking of shared MD pages used in connection with deduplicated data where such shared MD pages can be locked, for example, in connection with determining whether candidate data pages are duplicates of existing target pages and then when committing the above-noted deduplicate data commit transaction. The foregoing locking contention of shared MD pages, such as shared VLB pages in connection with deduplicated data, can be even more severe i) because such MD pages can be shared by multiple flushing threads across multiple nodes of the system and ii) due to the large size of the foregoing transactions and thus increased amount of time that the shared MD pages can be held or locked by a transaction.

In at least one approach, prior to performing the duplicate data commit transaction, processing can be performed to determine that a data page of the flush set is a duplicate of an existing data page having a corresponding shared VLB entry. The duplicate data commit transaction can subsequently reference and use the corresponding shared VLB entry of the existing data page in connection with its processing. However, in some cases, the shared VLB entry of the existing data page can become stale and thus invalid prior to its use in the duplicate data commit transaction. Put another way, detection processing to determine duplicate data pages can be performed one transaction and then the duplicate data commit transaction can be performed. Suitable locks for the shared VLB entry can be acquired and released separately by the detection processing transaction and the duplicate data commit transaction. Thus there can be a window of time between the detection processing and the duplicate data commit transaction where the shared VLB entry can become stale or invalid subsequent to its use by the detection processing to determining duplicate pages, and prior to its use in the duplicate data commit transaction. For example due to non-deterministic race conditions, the shared VLB entry can be stale or invalid i) if the corresponding existing data page is removed or deleted in the window of time prior to its use in the duplicate data commit transaction, or ii) if the shared VLB entry or page including the VLB shared entry is deleted or moved in the window of time. As a result of the foregoing invalid shared VLB entry, the data page of the flush set can remain in the log as dirty data that can be processed again in connection with another subsequent flush cycle thereby causing a delay and inefficiency in log flushing.

Accordingly described in the following paragraphs are techniques of the present disclosure that can be used in connection with overcoming drawbacks, such as those noted above.

In at least one embodiment, the techniques of the present disclosure provide for omitting or eliminating the above-noted separate transaction (e.g., the duplicate data commit transaction) that commits duplicate data of the flush set, and alternatively integrating the duplicate data commit transaction's processing or workflow efficiently into other transactions and processing. In at least one embodiment, the techniques of the present disclosure include partitioning relevant portions of the duplicate data commit transaction into separate transactions based, at least in part, on the particular MD page types updated. For example in at least one embodiment, first processing of the above-noted duplicate data commit transaction that updates reference counts of VLB entries of one or more VLB pages can be included in one transaction, and second processing of the above-noted duplicate data commit transaction that updates MD leaf entries of one or more MD leaf pages can be included in another different transaction. In contrast, one approach as noted above not using the techniques of the present disclosure may include both the foregoing first and second processing in the same duplicate data commit transaction.

In at least one embodiment, for each data page of the flush set determined to be a duplicate of an existing stored data page, the reference count of a VLB page entry associated with the existing stored data page can be incremented by 1. In at least one embodiment, the techniques of the present disclosure can utilize a first transaction (sometimes referred to as a preprocess transaction) that includes incrementing or updating reference counts of VLB page entries of existing stored data pages corresponding to duplicate data pages of the flush set. Each reference count of a VLB page entry can denote a number of times that a corresponding data page is referenced by a different logical address. Thus the VLB entry reference count can denote the number of times that the same corresponding data page is stored in multiple logical addresses. In at least one embodiment, the first transaction can be performed that includes updating or incrementing the reference counts of all VLB page entries corresponding to deduplicated data pages of the flush set. In at least one embodiment, the first transaction may update only a single type of MD page, VLB pages. In at least one embodiment, the first transaction can update or increment the foregoing reference counts of VLB entries without updating any other metadata.

In at least one embodiment, the first transaction can also include other processing which utilizes or reads VLB entries to obtain existing target data pages used in connection with performing data comparisons to determine whether a dirty data page written by the flush set is a duplicate of any existing target data page.

In at least one embodiment, the unique data commit transaction noted above can be modified or replaced with a unified commit transaction (sometimes referred to as a unified transaction). The unified commit transaction can include binding both the unique data pages and the duplicate data pages of the flush set to corresponding logical addresses. In at least one embodiment, the unified commit transaction can include the above-noted second processing that uses and locks one or more MD leaf pages. In at least one embodiment, each MD leaf page can include MD leaf entries each corresponding uniquely to a single logical address. For a flush set including both unique and duplicate data pages, the unified commit transaction for the flush set may include updating MD leaf entries of one or more MD pages to reference VLB entries associated with both unique and duplicate data pages or blocks. Data pages of the flush set can be determined as unique and not a duplicate of an existing stored target data page. Data pages of the flush set can be determined to be a duplicate of an existing stored target data page. In at least one embodiment, the unified transaction can include performing processing to bind logical addresses to newly allocated and initialized VLB entries corresponding to unique data blocks.

In at least one embodiment, the first transaction that includes updating the reference counts of the VLB entries can be performed prior to the unified commit transaction.

In at least one embodiment of the first transaction, updating the reference counts of VLB entries can be performed i) after determining candidate target data pages, if any, for each of the data pages of the flush set, and ii) prior to performing a full data comparison of each candidate target data page to a corresponding data page of the flush set. As a variation in at least one embodiment of the first transaction, updating the reference counts of VLB entries can be performed i) after determining candidate target data pages, if any, for each of the data pages of the flush set, and ii) also after performing a full data comparison of each candidate target data page to a corresponding data page of the flush set.

In at least one embodiment, each candidate target data page can be an existing data page stored on the storage system which has a corresponding hash value matching a calculated hash value of a data page of the flush set but for which a full data comparison has not yet been performed. In at least one embodiment, the full data comparison of the candidate target data page and the data page of the flush set can be performed to determine whether the foregoing two data pages are identical or duplicate in terms of content. In at least one embodiment, the full data comparison can be performed to account for any potential hash collision where a hash function used generates the same hash value for two non-identical data pages.

In at least one embodiment, once the reference count of an existing VLB entry corresponding to an existing target data block or page is updated and thus committed by the first or preprocess transaction, the corresponding existing target data block or data page associated with the VLB entry can be characterized as protected and/or secured in that it will not be deleted prior to its subsequent use or reference in connection with other processing of the unified transaction, such as in connection with binding a logical address to the corresponding target data block to denote that the logical address stores deduplicated content. In at least one embodiment, a stored data page such as a target data page can be deleted or removed if its reference count goes to 0. In this case using the techniques of the present disclosure in at least one embodiment, the reference count has been further incremented by 1 in the first or preprocess transaction prior to binding the target data page to a corresponding logical address determined to store a duplicate of the target data page. In this manner, the target data block and it's corresponding VLB entry cannot be removed or deleted (e.g., by having the reference count go to 0) even if a current MD leaf entry of another logical address also referencing the VLB entry is updated to no longer store the target data block thereby resulting in decrementing the reference count by 1. Even with such a decrement applied to the reference count, the reference count corresponding to the target data block is guaranteed to remain greater than zero.

In at least one embodiment, if a flush thread is flushing a unique data block stored at a logical address, resources such as the corresponding VLB entry can be characterized as local to the flush thread or more generally used only by the flush thread since the corresponding data block is unique and not yet referenced or used in connection with other logical addresses. In contrast, if a flush thread is flushing a duplicate data block that is a duplicate of a stored target block, resources such as the corresponding VLB entry can be characterized as global and shared by other threads or processes that may also need to access the same target stored block since the same target stored block is referenced and stored at one or more other logical addresses. As a result, there can be more contention in connection with flush workflow processing for such shared resources used in connection with duplicate data blocks than in connection with other resources of corresponding unique data blocks.

Flushing can include performing transactions where each transaction such as discussed in connection with the techniques of the present disclosure can include multiple operations that are performed atomically as a single transaction for consistency. For a transaction of multiple operations, either all the multiple operations of the transaction are performed or committed, or none of the multiple operations of the transactions are performed or committed. Accordingly in at least one embodiment, if a failure occurs in connection with one of the updates of the transaction, none of the updates to the transaction are committed.

In at least one embodiment, in connection with flushing a log entry for a write operation that writes a candidate data block B2 at a logical address LA1 where the candidate block B2 is determined to be a duplicate of an existing target block B1, processing can include i) updating a MD leaf entry E1 corresponding to LA1 to point to or reference an existing VLB entry E2 corresponding to the existing target block B1; and ii) incrementing a reference count of the VLB entry E2 by 1 to denote the additional reference to B1 by LA1 due to the detected duplication of B1 (whereby B2 can be characterized as deduplicated in that it has been detected as a duplicate of B1). The VLB entry E2 can include the physical storage location PA1 on BE non-volatile storage where B1 is stored.

In at least one embodiment, in connection with flushing a log entry for a write operation that writes a candidate data block B12 at a logical address LA11 where the candidate block B12 is determined to be a unique data block and is not to be a duplicate of any existing target block, processing can include i) storing B12 as a new target block on the storage system; ii) initializing a new corresponding VLB entry V1, where such initializing can include: a) updating V1 to reference or point to the physical storage location PA2 on BE non-volatile storage where B12 is stored; b) setting or initializing other fields of V1 such as initializing the reference count of V1 to 1; and iii) updating a MD leaf entry E11 corresponding to LA11 to point to or reference the new VLB entry V1 corresponding to the B12. In at least one embodiment, VLB entry V1 can be updated to include PA2.

Figure 9A:
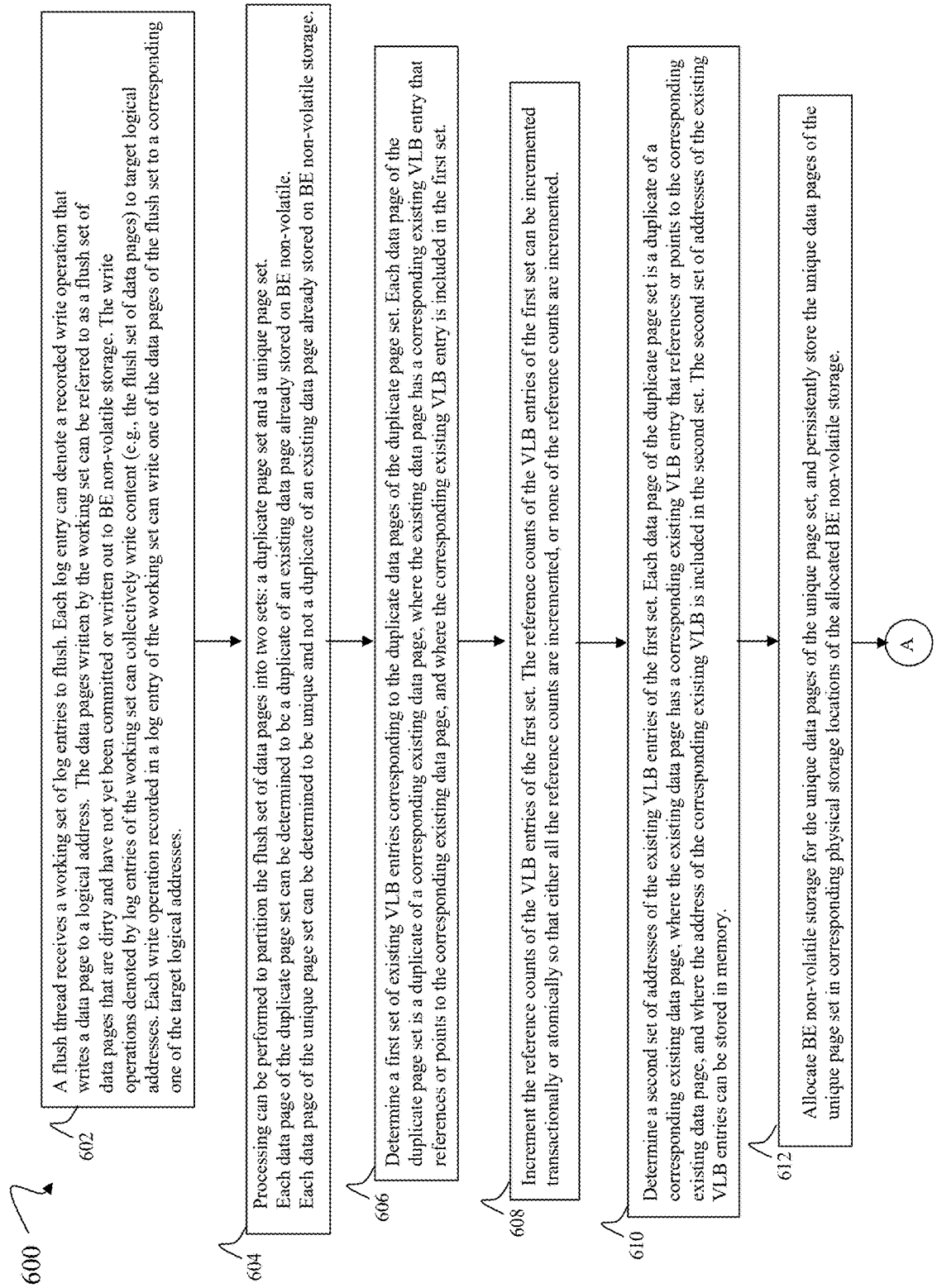

What will now be described with reference to FIGS. 9A, 9B, 10A and 10B is an example further illustrating use of the techniques of the present disclosure in at least one embodiment. FIGS. 9A and 9B are processing steps that are further illustrated in connection with a particular example in FIGS. 10A and 10B.

Referring to FIGS. 9A and 9B, shown is a flowchart 600, 601 of processing that can be performed in at least one embodiment in accordance with the techniques of the present disclosure.

At the step 602, a flush thread receives a working set of log entries to flush. Each log entry can denote a recorded write operation that writes a data page to a logical address. The data pages written by the working set can be referred to as a flush set of data pages that are dirty and have not yet been committed or written out to BE non-volatile storage. The write operations denoted by log entries of the working set can collectively write content (e.g., the flush set of data pages) to target logical addresses. Each write operation recorded in a log entry of the working set can write one of the data pages of the flush set to a corresponding one of the target logical addresses. From the step 602, control proceeds to the step 604.

At the step 604, processing can be performed to partition the flush set of data pages into two sets: a duplicate page set and a unique page set. Each data page of the duplicate page set can be determined to be a duplicate of an existing data page already stored on BE non-volatile. Each data page of the unique page set can be determined to be unique and not a duplicate of an existing data page already stored on BE non-volatile storage.

Figure 10A:
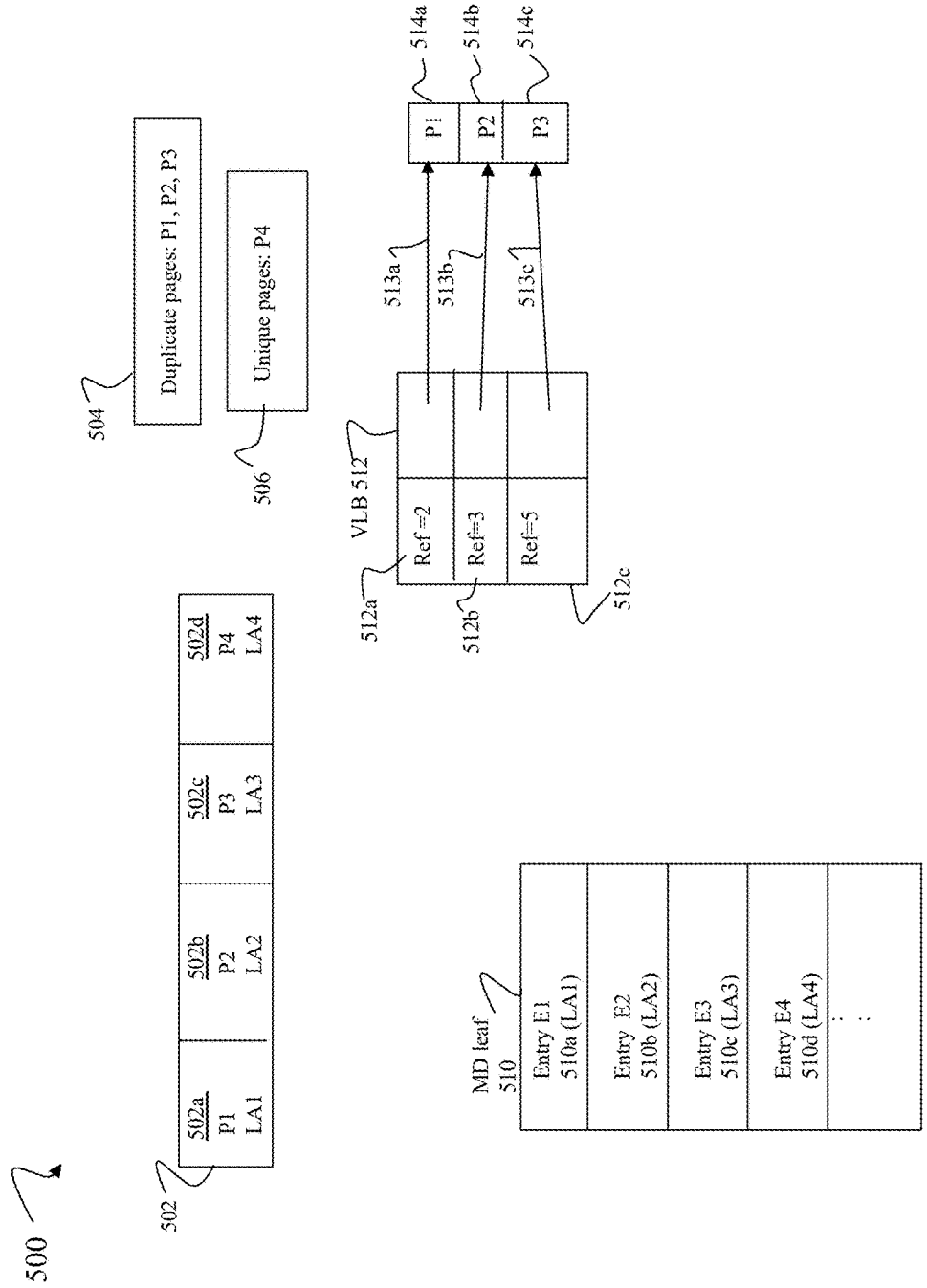
FIGS. 10A and 10B are example illustrating various data and metadata that can be used in connection with the techniques of the present disclosure.

To further illustrate step 602 and 604, reference is made to the example 500 of FIG. 10A. In FIG. 10A, the element 502 can denote the working set of log entries 502a-d being flushed by a flush thread where each of the log entries of 502 denotes a recorded write operation that writes a data page to a target logical address. Element 502a denotes a log entry of first write that writes data page P1 to the target logical address LA1. Element 502b denotes a log entry of a second write that writes data page P2 to the target logical address LA2. Element 502c denotes a log entry of a third write that writes data page P3 to the target logical address LA3. Element 502d denotes a log entry of a fourth write that writes data page P4 to the target logical address LA4. In this example 500 for simplicity of illustration, the flush set of data pages that are dirty and have not yet been committed or written out to BE non-volatile storage include data pages P1, P2, P3 and P4.

The step 604 can be performed to partition the flush set of pages P1-P4 into the duplicate page set 504 and the unique page set 506, where the duplicate page set includes data pages P1-P3 and the unique page set includes only data page P4.

Returning to FIG. 9A, following the step 604, the step 606 can be performed. At the step 606, processing can determine a first set of existing VLB entries corresponding to the duplicate data pages of the duplicate page set. Each data page of the duplicate page set is a duplicate of a corresponding existing data page, where the existing data page has a corresponding existing VLB entry that references or points to the corresponding existing data page, and where the corresponding existing VLB entry is included in the first set.

With reference again to FIG. 10A, step 606 can be performed with respect the example 500 where the duplicate page set 504 includes P1-P3. In the example 500, MD leaf 510 can include MD leaf entries 510a-d corresponding respectively to the logical addresses LA1, LA2, LA3 and LA4. Thus in this example LA1, LA2, LA3 and LA4 can denote consecutive logical addresses in a range of logical addresses corresponding to MD leaf 510. Each MD leaf entry of 510 can be used for representing the logical binding or mapping of an associated logical address to a corresponding physical address or location on BE non-volatile storage of content stored at the associated logical address. Consistent with discussion herein, the MD leaf 510 can denote a MD page included in mapping information of a chain of MD pages used to map a logical address to a corresponding physical storage location of content stored at the logical address.

In the example 500, VLB page 512 can include VLB entries 512a-c. The VLB entry 512a can be an existing VLB associated with the existing data page P1 514a, also found to be a duplicate in the flush set of data pages. The VLB entry 512a can reference or point to (513a) the data page P1. The VLB entry 512b can be an existing VLB associated with the existing data page P2 514b, also found to be a duplicate in the flush set of data pages. The VLB entry 512b can reference or point to (513b) the data page P2. The VLB entry 512c can be an existing VLB associated with the existing data page P3 514c, also found to be a duplicate in the flush set of data pages. The VLB entry 512c can reference or point to (513c) the data page P3.

The step 606 can determine that the first set of existing VLB entries includes VLB entries 512a-c. Returning to FIG. 9A, control proceeds from the step 606 to the step 608.

Figure 10B:
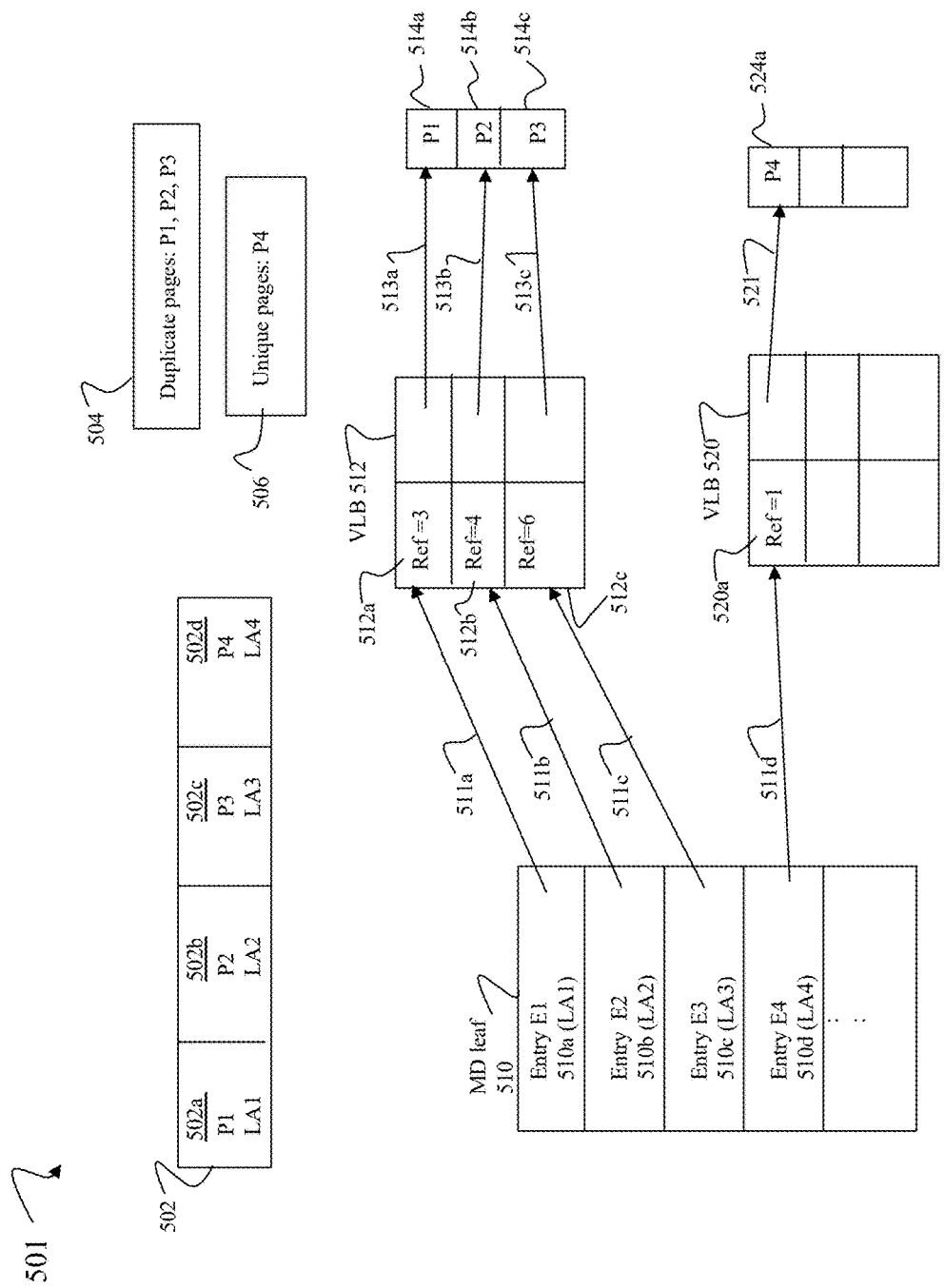

At the step 608, processing can be performed to transactionally increment the reference counts of the VLB entries of the first set. The reference counts of the VLB entries of the first set can be incremented transactionally or atomically so that either all the reference counts are incremented, or none of the reference counts are incremented. With reference to the example 500 of FIG. 10A, the step 608 can include incrementing the reference counts of the VLB entries 512a-c. Referring to the example 501 of FIG. 10B, shown are the reference counts of the VLB entries 512a-c after performing the foregoing atomic or transactional increments. As can be seen, the reference count of VLB entry 512a is updated from 2 (in FIG. 10A) to 3 (in FIG. 10B); the reference count of VLB entry 512b is updated from 3 (in FIG. 10A) to 4 (in FIG. 10B); and the reference count of VLB entry 512c is updated from 5 (in FIG. 10A) to 6 (in FIG. 10B).

Returning to FIG. 9A, control proceeds from the step 608 to the step 610. At the step 610, processing can determine a second set of addresses of the existing VLB entries of the first set. Each data page of the duplicate page set is a duplicate of a corresponding existing data page, where the existing data page has a corresponding existing VLB entry that references or points to the corresponding existing data page, and where the address of the corresponding existing VLB is included in the second set. The second set of addresses of the existing VLB entries can be stored in memory. With reference to FIG. 10A performing the step 610 can include determining that the second set of addresses of existing VLB entries of duplicate data pages of the flush set includes the 3 addresses of VLB entries 512a-c.

From the step 610, control proceeds to the step 612. At the step 612, processing can be performed to allocate BE non-volatile storage for the unique data pages of the unique page set, and persistently store the unique data pages of the unique page set in corresponding physical storage locations of the allocated BE non-volatile storage. From the step 612 control proceeds to the step 614.

At the step 614, processing can be performed to allocate and initialize new VLB entries for the unique data pages of the unique page set as stored on BE non-volatile storage. Each new VLB entry references or points to a physical storage location of one of the unique data pages as stored on BE non-volatile storage. Each new VLB entry has a reference count that can be initialized to 1.

With reference to FIG. 10A, performing the step 612 can include allocating storage for persistently storing the unique data page P4. With reference to FIG. 10B, element 524a denotes the allocated BE non-volatile storage newly allocated and used to store the unique data page P4. With reference to FIG. 10B, performing the step 614 can include allocating and initializing the new VLB entry 520 of the VLB page 520. The new VLB entry 520 can have its reference count 520a set to 1 and can be updated to reference or point to (521) the physical storage location or address 524a of the data page P4.

Returning to FIG. 9B, control proceeds from the step 614 to the step 616. At the step 616, processing can be performed to to bind or map the target logical addresses to physical storage locations of corresponding data pages stored at the target logical addresses. The foregoing binding or mapping can be performed transactionally or atomically so that either all target logical addresses are mapped or bound, or none of the target logical addresses are mapped or bound.

Each target logical address has a corresponding unique MD leaf entry. Processing to bind the target logical address having a corresponding unique MD leaf entry can include updating the corresponding unique MD leaf entry to reference, or point to, a VLB entry corresponding to a data page stored at the target logical address. If the data page stored at the target logical address is included in the duplicate page set, the data page's corresponding VLB entry is an existing VLB entry of the first set, where the existing VLB entry's address can be obtained from the second set of VLB entry addresses stored in memory (e.g., in step 610).

If the data page stored at the target logical address is included in the unique page set, the data page's corresponding VLB is one of the new VLB entries. In at least one embodiment, all MD leaf entries corresponding to the target logical addresses written to by log entries of the working set can be updated transactionally or atomically as noted above.

In at least one embodiment, each MD leaf can be associated with a unique subrange of consecutive logical addresses mapped by corresponding entries of the MD leaf. In some scenarios, all or at least some of the target logical addresses bound can be included in the same single subrange associated with the same MD leaf. In this case, all target logical addresses falling in the same subrange associated with the same MD leaf can be bound to corresponding data pages by updating corresponding entries of the same MD leaf, where such data pages can include both unique data pages and duplicate data pages.

Referring to FIG. 10B, performing the step 616 can include transactionally updating MD leaf entries 510a-d to respectively point to or reference (511a-d) corresponding VLB entries 512a-c, 520a.

Thus FIG. 10B illustrates various metadata, data and structures at a point in time after performing the steps of FIGS. 9A and 9B.

In at least one embodiment, the steps 604, 606, 608 and 610 can be included in the first transaction or preprocess transaction noted elsewhere herein. In at least one embodiment, the steps 612, 614 and 616 can be included in a second transaction or the unified transaction noted elsewhere herein.

In at least one embodiment, processing of the first transaction can include obtaining necessary locks on existing VLB entries of existing data pages already stored on the storage system in order to i) perform any needed data comparisons of the existing data pages to candidate data pages of the flush set (step 604); and ii) increment the corresponding reference counters (step 608).

In at least one embodiment, processing of the unified transaction can include obtaining necessary locks on MD leaf entries that are updated in the step 616.

Figure 11:
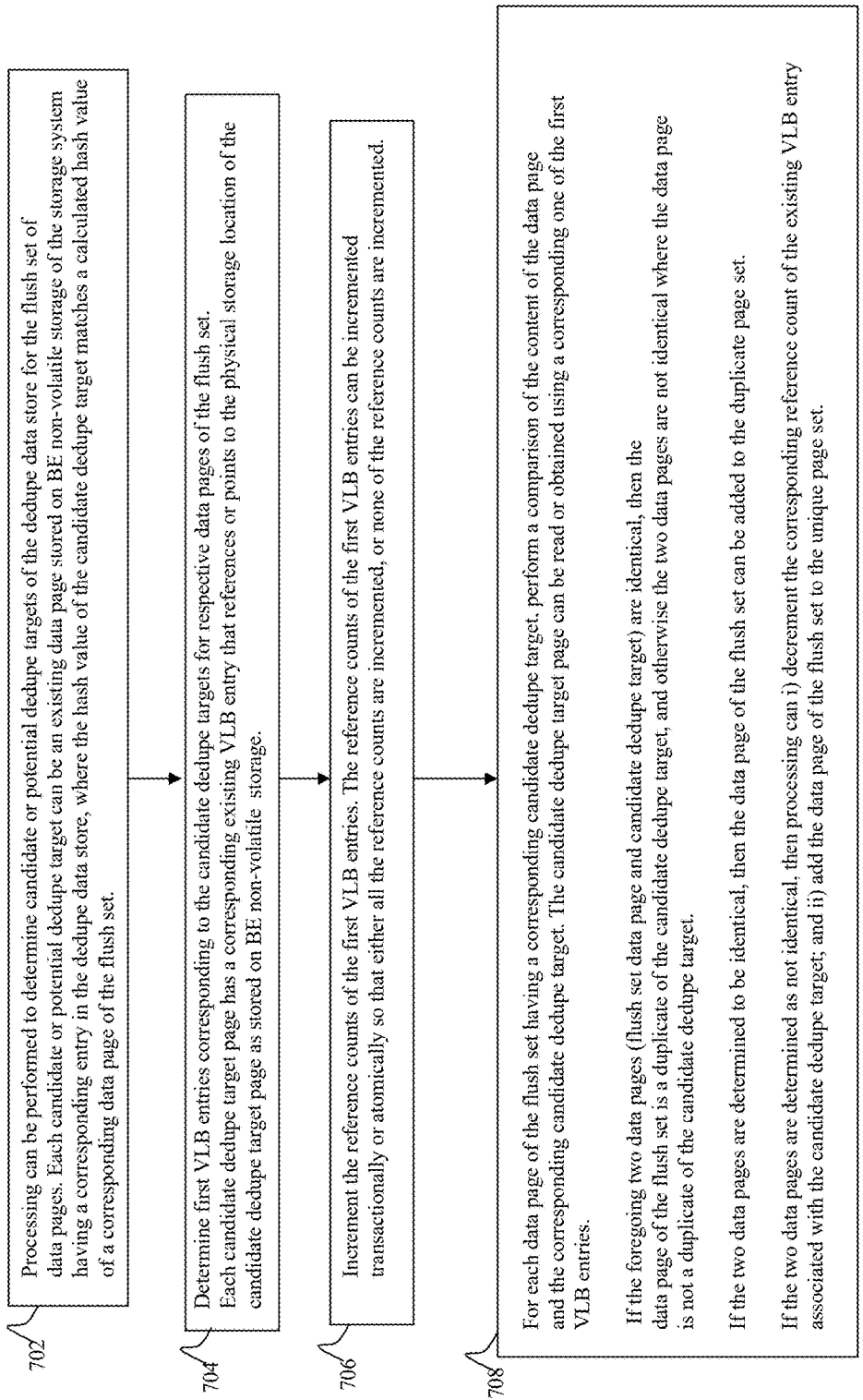

Referring to FIG. 11, shown is a flowchart 700 of processing that can be performed in at least one embodiment in accordance with the techniques of the present disclosure. The example 700 provides further detail regarding processing that can be performed to determine which data pages of the flush set are duplicates of existing data pages and which are unique data pages, as well as one particular ordering of steps with respect to incrementing reference counters.

At the step 702, processing can be performed to determine candidate or potential dedupe targets of the dedupe data store for the flush set of data pages. Each candidate or potential dedupe target can be an existing data page stored on BE non-volatile storage of the storage system having a corresponding entry in the dedupe data store, where the hash value of the candidate dedupe target matches a calculated hash value of a corresponding data page of the flush set. An example of the dedupe data store used in at least one embodiment is discussed elsewhere herein, such as in connection with FIGS. 7 and 8. From the step 702, control proceeds to the step 704.

At the step 704, processing can determine first VLB entries corresponding to the candidate dedupe targets for respective data pages of the flush set. Each candidate dedupe target page has a corresponding existing VLB entry that references or points to the physical storage location of the candidate dedupe target page as stored on BE non-volatile storage. From the step 704, control proceeds to the step 706.

At the step 706, processing can transactionally increment the reference counts of the first VLB entries so that either all the reference counts are incremented, or none of the reference counts are incremented. From the step 706, control proceeds to the step 708.

At the step 708, For each data page of the flush set having a corresponding candidate dedupe target, perform a comparison of the content of the data page and the corresponding candidate dedupe target. The candidate dedupe target page can be read or obtained using a corresponding one of the first VLB entries. If the foregoing two data pages (flush set data page and candidate dedupe target) are identical, then the data page of the flush set is a duplicate of the candidate dedupe target, and otherwise the two data pages are not identical where the data page is not a duplicate of the candidate dedupe target. If the two data pages are determined to be identical, then the data page of the flush set can be added to the duplicate page set. If the two data pages are determined as not identical, then processing can i) decrement the corresponding reference count of the existing VLB entry associated with the candidate dedupe target; and ii) add the data page of the flush set to the unique page set.

Figure 12:
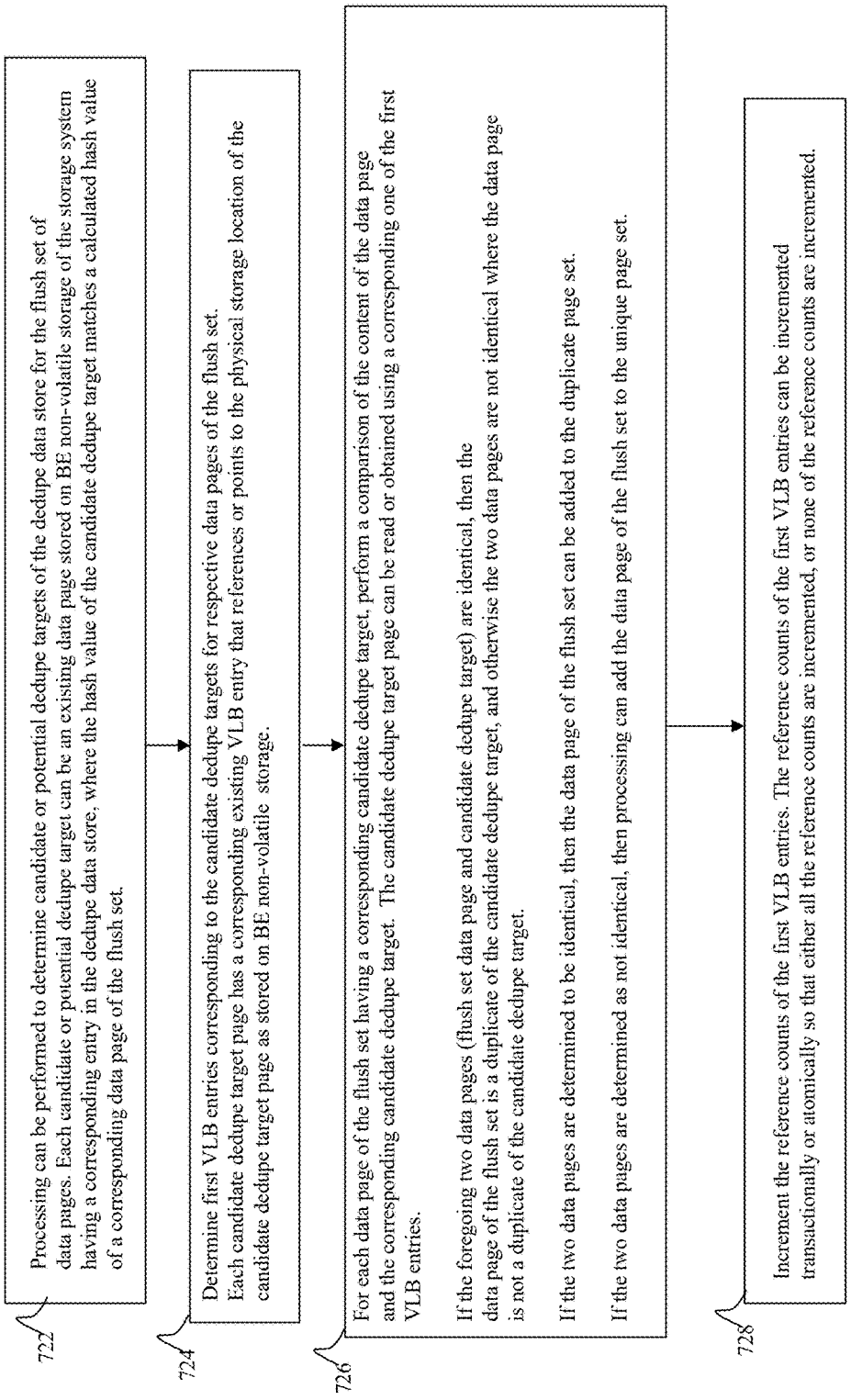

Referring to FIG. 12, shown is a flowchart 701 of processing that can be performed in at least one embodiment in accordance with the techniques of the present disclosure. The example 701 provides further detail regarding processing that can be performed to determine which data pages of the flush set are duplicates of existing data pages and which are unique data pages, as well as one particular ordering of steps with respect to incrementing reference counters. The steps of 701 can be performed in at least one embodiment as an alternative to performing the steps of 700.

At the step 722, processing can be performed to determine candidate or potential dedupe targets of the dedupe data store for the flush set of data pages. Each candidate or potential dedupe target can be an existing data page stored on BE non-volatile storage of the storage system having a corresponding entry in the dedupe data store, where the hash value of the candidate dedupe target matches a calculated hash value of a corresponding data page of the flush set. From the step 722, control proceeds to the step 724.

At the step 724, processing can determine first VLB entries corresponding to the candidate dedupe targets for respective data pages of the flush set. Each candidate dedupe target page has a corresponding existing VLB entry that references or points to the physical storage location of the candidate dedupe target page as stored on BE non-volatile storage. From the step 724, control proceeds to the step 726.

At the step 726, for each data page of the flush set having a corresponding candidate dedupe target, perform a comparison of the content of the data page and the corresponding candidate dedupe target. The candidate dedupe target page can be read or obtained using a corresponding one of the first VLB entries. If the foregoing two data pages (flush set data page and candidate dedupe target) are identical, then the data page of the flush set is a duplicate of the candidate dedupe target, and otherwise the two data pages are not identical where the data page is not a duplicate of the candidate dedupe target. If the two data pages are determined to be identical, then the data page of the flush set can be added to the duplicate page set. If the two data pages are determined as not identical, then processing can add the data page of the flush set to the unique page set. From the step 726, control proceeds to the step 728.

At the step 728, processing can transactionally increment the reference counters of the first VLB entries so that either all or none of the reference counters are updated.

Figure 13:
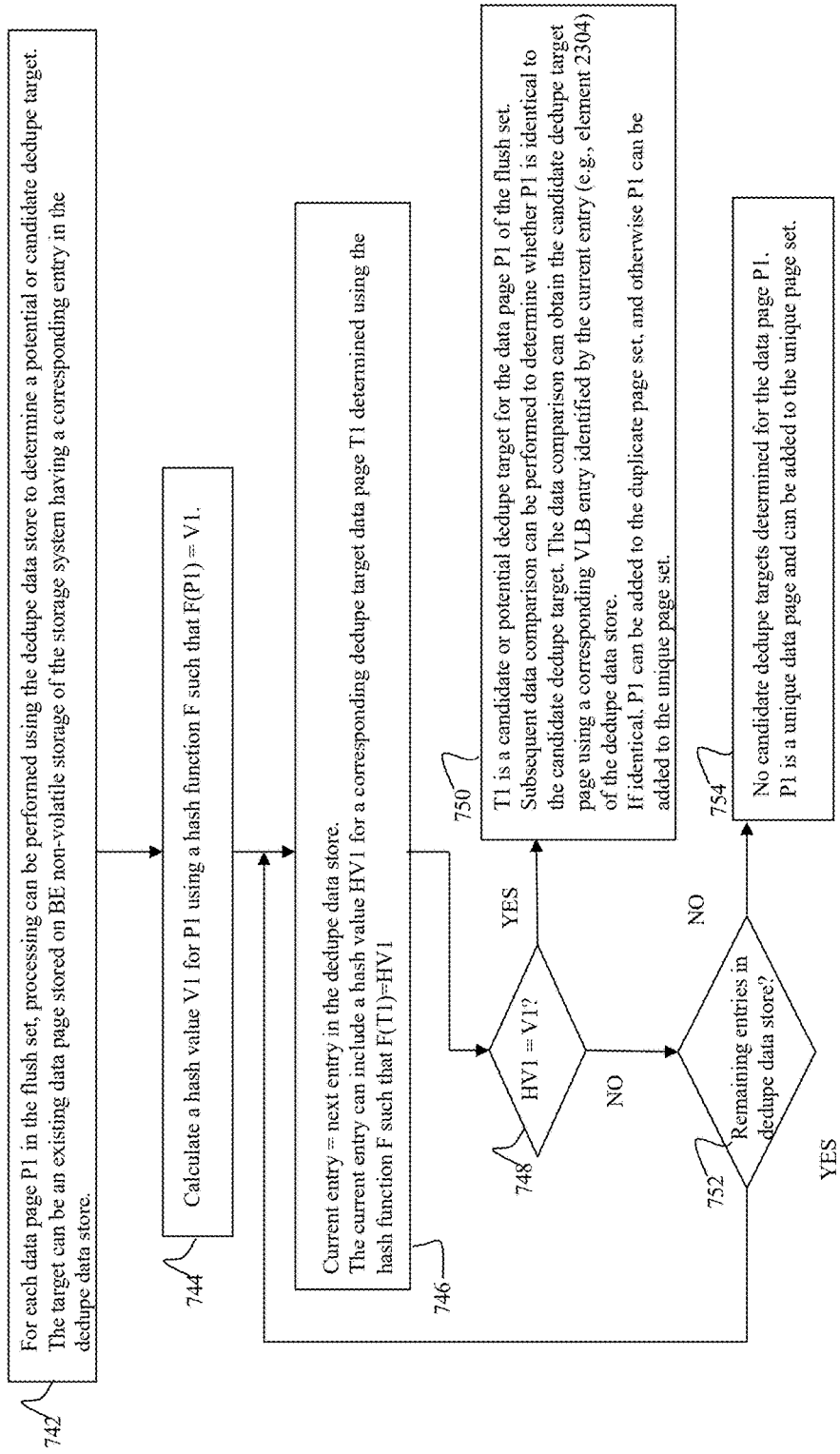

Referring to FIG. 13, shown is a flowchart 703 of processing that can be performed in at least one embodiment in accordance with the techniques of the present disclosure. The steps of 703 provide further detail regarding determining candidate dedupe targets of the dedupe data store for data pages of the flush set in at least one embodiment.

At the step 742, for each data page P1 in the flush set, processing can be performed using the dedupe data store to determine a potential or candidate dedupe target. The target can be an existing data page stored on BE non-volatile storage of the storage system having a corresponding entry in the dedupe data store. From the step 742, control proceeds to the step 744.

At the step 744, processing can calculate a hash value V1 for P1 using a hash function F such that F (P1)=V1. From the step 744, control proceeds to the step 746.

At the step 746, current entry is assigned the next entry in the dedupe data store where current entry denotes the next dedupe target to be evaluated as a potential duplicate or match of the data page P1. In the step 746, the current entry of the dedupe data store can include a hash value HV1 for a corresponding dedupe target data page T1, where HV1 can be determined using the hash function F such that F (T1)-HV1. From the step 746, control proceeds to the step 748.

At the step 748, a determination is made as to whether HV1 is equal to V1. If so, step 748 evaluates to yes and control proceeds to the step 750. Otherwise if the step 748 evaluates to no, control proceeds to the step 752.

At the step 750, it is determined that T1 is a candidate or potential dedupe target (e.g., potential match) for the data page P1 of the flush set. Subsequent data comparison can be performed to determine whether P1 is identical to the candidate dedupe target. The data comparison can obtain the candidate dedupe target page using a corresponding VLB entry identified by the current entry (e.g., element 2304) of the dedupe data store. If identical, P1 can be added to the duplicate page set, and otherwise P1 can be added to the unique page set.

At the step 752, a determination can be made as to whether there are remaining entries in the dedupe data store to be evaluated. If the step 752 evaluates to no, control proceeds to the step 754. At the step 754, it is determined that no candidate dedupe targets have been found in the dedupe data store for the data page P1. P1 can be determined as a unique data page and can be added to the unique page set. If the step 752 evaluates to yes, control returns to the step 746 to evaluate the next dedupe data store entry.

It should be noted that the steps 744 and subsequent steps can be repeated for each data page in the flush set even though FIG. 13 only illustrates performing them for a single data page P1.

As a variation to the foregoing in connection with the step 750 in at least one embodiment, if the data comparison determines that P1 is not identical to the candidate dedupe target, rather than add P1 to the unique page set, an embodiment can alternatively proceed from step 750 to the step 752 to further evaluate any remaining dedupe data store entries.

In at least one embodiment, if a data page is determined as being unique, a corresponding entry can also be added to the dedupe data store.

In at least one embodiment of the techniques of the present disclosure, incrementing the reference counts of the first transaction or preprocess transaction can be characterized as optimistically or opportunistically performed with respect to the incremented reference counts of corresponding candidate target dedupe pages. In at least one embodiment, an incref or increment of a reference count of a candidate target dedupe page can be optimistically or opportunistically performed in that i) a data comparison may not have yet been performed with respect to the content of a corresponding flushed data page and the candidate target dedupe page (e.g., to rule out the possibility of a hash collision where the flushed data page and the candidate target dedupe page are not identical but yet have the same matching hash value), and ii) the actual binding of a corresponding logical address and the candidate target dedupe page has not yet been performed by the unified transaction.

Based on the foregoing in at least one embodiment, a data leak can result from separating i) the incrementing of a reference count of a VLB entry for target data page from ii) a corresponding binding of the target data page/VLB entry to a logical address (e.g., where the binding includes updating a MD leaf entry corresponding to the logical address to reference the VLB entry associated with the target data page). Thus in at least one embodiment, the data leak for an incremented reference count of the first transaction can be due to i) a subsequent data comparison determining the flushed data page and candidate target dedupe page are not identical, or ii) failure of the unified transaction. For example, the unified transaction can fail if the system crashes or is rebooted prior to performing or prior to completing the unified transaction. As another example, the unified transaction can fail under certain circumstances where the system remains alive and running. For example, the unified transaction can fail due to a failure to acquire needed or required resources.

In at least one embodiment, a solution can be implemented to avoid or cure any potential data leak resulting from the above-noted conditions.

In a first scenario, consider the case where the unified transaction fails to complete but the system remains up and running. If the unified transaction fails, logical addresses of duplicate data of the flush set have not been bound to corresponding existing data pages despite the fact that corresponding reference counters have already been incremented. In this case, flush processing state can be tracked in memory regarding the particular reference counts that have been incremented prior to the unified transaction failure. In at least one embodiment, the flush processing state can track the particular VLB entries for which the reference counts have been incremented. Upon failure of the unified transaction where the system remains up and running, processing can be performed to rollback the particular reference counts that have been incremented. In at least one embodiment, such rollback processing can include performing a decref or decrement reference count operation to undo each increment reference count or incref operation performed prior to the unified transaction failure.

In a second scenario, consider the case where the system remains up and running and where a data comparison of a flushed data page and candidate target dedupe page determines that the foregoing two pages are not identical in terms of matching content even though a corresponding reference count was incremented prior to the data comparison. In this case, a decref can be performed to the corresponding reference count to undo the prior optimistic or opportunistic increment of the reference count.

In a third scenario, consider the case where the system crashes and is rebooted. In this case, the contents of memory (e.g., volatile memory) storing the flush state can be lost whereby the in-memory flush state of the first scenario cannot be used. When performing the above-noted first transaction or preprocess transaction, a flush thread performing flush processing can persistently track in an incref journal or log the particular reference counts incremented. For example, the flush thread can record in the incref journal the particular VLB entries for which reference counts are incremented. When a system is rebooted, reboot or recovery processing can be performed that includes examining persistently recorded information describing the general state of the system when the crash or other event occur causing the reboot occurred. Such recorded information can include the persisted incref journal where recovery processing or reboot processing can include rolling back the increfs as recorded in the incref journal. In at least one embodiment, the rollback processing can include issuing a decref for each incref recorded in the persistent incref journal. In at least one embodiment, each flush thread performing flush processing can have its own dedicated persistent journal, or dedicated portion thereof, to avoid contention with other flush threads that may also be persistently recording particular reference counters incremented by such other flush threads.

Consistent with the above discussion, embodiments using the techniques of the present disclosure can have benefits such as in terms of performance and efficiency. In at least one embodiment using the first transaction or preprocess transaction, one benefit is a reduction in flush latency and a reduction in contention for VLB pages by segregating VLB page locking into the first or preprocess transaction whereby there is no VLB page locking in the unified transaction. In at least one embodiment using the unified transaction, a second benefit can be a reduction in flush time by having the unified transaction perform the binding or mapping of logical addresses to corresponding physical storage locations of both unique and deduplicated data pages. In at least one embodiment, the techniques of the present disclosure can be used to structure the first or preprocess transaction and the unified transaction to reduce locking complexity and flush latency. In at least one embodiment, the techniques of the present disclosure can be used to secure dedupe targets (e.g., existing data blocks determined to match corresponding data blocks of the flush set) during the preprocess transaction to thereby provide for reducing or eliminating non-deterministic race conditions that can result in invalid or stale VLB entries. As a result of securing the dedupe targets, flush processing is more deterministic and the efficiency of flush processing is improved.

In at least one embodiment, the benefits provided by utilizing the techniques of the present disclosure can result in a performance improvement of inline deduplication processing performed during flushing of the log.

In at least one embodiment, the techniques of the present disclosure can be particularly beneficial when a single flush thread is flushing entries of the log that write or store data pages to a consecutive range of logical addresses. In at least one embodiment, the data pages written to corresponding logical addresses in the consecutive range of logical addresses can include both unique data pages and deduplicated data pages. In at least one embodiment, each MD leaf page can be associated with a first logical address range of consecutive logical addresses, where the MD leaf page can include a MD leaf page entry for each logical address in the first logical address range corresponding to the MD leaf page. The MD leaf page entry for a logical address can be mapped to a VLB entry associated with a data page or content stored at the logical address. The VLB entry can include a reference, pointer to, or address of a physical storage location on BE non-volatile storage of the data page or content stored at the logical address. In at least one embodiment, a first MD leaf page can be associated with a first logical address range R1 and can include entries denoting bindings of logical addresses of R1 to corresponding physical storage locations of content stored at the logical addresses of R1. The flush thread can flush log entries of recorded write operations to store data pages to corresponding logical addresses included in a consecutive range R2 of logical addresses, where all or at least some of the logical addresses of R2 are also included in R1. In at least one embodiment, the data pages stored at logical addresses of R2 can include both unique and duplicate data pages where VLB entries of such pages can be bound or mapped to corresponding MD leaf entries of one or more MD leaf pages in the unified transaction.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
receiving a plurality of write operations writing a plurality of data pages to a plurality of logical addresses, wherein each of the plurality of write operations writes one of the plurality of data pages to one of the plurality of logical addresses;
recording each of the plurality of write operations in one of a plurality of log entries of a log; and
flushing the plurality of log entries from the log, wherein said flushing includes performing deduplication of the plurality of data pages, said flushing including:
partitioning the plurality of data pages into a first portion and a second portion, wherein the first portion includes data pages of the plurality of data pages that are determined to be duplicates of existing data pages already stored on a storage system, and wherein the second portion includes data pages of the plurality of data pages determined to be unique data pages that are not duplicates of the existing data pages already stored on the storage system;
atomically incrementing reference counts each corresponding to one of the existing data pages determined as identical to one of the data pages of the first portion, where said each reference count denotes a number of times the corresponding one of the existing data pages is referenced and stored in a unique logical address; and
atomically binding the plurality of logical addresses to the plurality of data pages, wherein said atomically binding includes:
binding the first portion of data pages to a corresponding third portion of the plurality of logical addresses each storing one data page of the first portion written by one of the plurality of write operations;
binding the second portion of data pages to a corresponding fourth portion of the plurality of logical addresses each storing one data page of the second portion written by one of the plurality of write operations; and
atomically binding metadata (MD) leaf entries to corresponding virtual layer block (VLB) entries, wherein each of the MD leaf entries is associated with one of the plurality of logical addresses, and wherein each of the corresponding VLB entries is associated with one of the plurality of data pages.

2. The computer-implemented method of claim 1, wherein the corresponding VLB entries include first existing VLB entries and first new VLB entries, wherein each VLB entry of the first existing VLB entries references or points to a physical storage location on non-volatile storage of one of the existing data pages determined to be identical to a data page of the first portion, and wherein each VLB entry of the first new VLB entries references or points to a physical storage location on non-volatile storage of one of the unique data pages of the second portion.

3. The computer-implemented method of claim 2, wherein said atomically incrementing the reference counts is performed prior to said atomically binding the plurality of logical addresses to the plurality of data pages.

4. The computer-implemented method of claim 3, wherein a dedupe data store includes entries each corresponding to one of the existing data pages stored on the storage system, wherein each entry for said one existing data page includes i) a corresponding hash value for said one existing data page, and ii) first information used to locate a physical storage location storing said one existing data page.

5. The computer-implemented method of claim 4, wherein the first information is a VLB entry referencing or pointing to the one existing data page.

6. The computer-implemented method of claim 5, further comprising:
for each data page of the plurality of data pages, performing first processing including:
determining a calculated hash value for said each data page;
determining whether the dedupe data store includes a first entry having a first hash value that is equal to the calculated hash value of said each data page, wherein the first hash value corresponds to a first of the existing data pages; and
responsive to determining that the dedupe data store includes the first entry with a first hash value equal to the calculated hash value of said each data page, determining that said first existing data page is a candidate deduplication target potentially identical to said each data page.

7. The computer-implemented method of claim 6, wherein the first processing includes:
performing a data comparison of said first existing data page and said each data page to determine whether the first existing data page is identical to said each data page.

8. The computer-implemented method of claim 7, wherein responsive to the data comparison determining that the first existing data page is identical to said each data page, including said each data page in said first portion of duplicate data pages.

9. The computer-implemented method of claim 8, wherein the first processing includes:
responsive to determining that the dedupe data store does not include any entry with a hash value equal to the calculated hash value of said each data page, determining that said each data page is unique and including said each data page in the second portion of unique data pages.

10. The computer-implemented method of claim 2, wherein a fifth portion of the plurality of logical addresses are included in a first logical address range of consecutive logical addresses associated with a first MD leaf page, wherein a sixth portion of the MD leaf entries are included in the first MD leaf page and used to bind the fifth portion of logical addresses to corresponding data pages stored at the fifth portion of logical addresses.

11. The computer-implemented method of claim 10, wherein the fifth portion of logical addresses includes
i) one or more logical addresses of the third portion each storing a data page of the first portion determined to be a duplicate of an existing data page already stored on the storage system, and ii) one or more logical addresses of the fourth portion each storing a data page of the second portion determined to be unique and not a duplicate of an existing data page already stored on the storage system.

12. The computer-implemented method of claim 1, wherein said atomically incrementing reference counts is included in a first transaction, and said atomically binding is included in a second transaction different from the first transaction.

13. The computer-implemented method of claim 1, wherein said atomically incrementing the reference counts is performed prior to said atomically binding the plurality of logical addresses to the plurality of data pages, and wherein said atomically incrementing completes successfully and said atomically binding fails to complete successfully.

14. The computer-implemented of claim 13, further comprising:
responsive to said atomically binding failing to complete successfully, performing rollback processing to rollback the incremented reference counts.

15. The computer-implemented method of claim 14, wherein said rollback processing includes decrementing each reference count previously incremented by said atomically incrementing.

16. A system comprising:
one or more processors; and
one or more memories comprising code stored thereon that, when executed, performs a method comprising:
receiving a plurality of write operations writing a plurality of data pages to a plurality of logical addresses, wherein each of the plurality of write operations writes one of the plurality of data pages to one of the plurality of logical addresses;
recording each of the plurality of write operations in one of a plurality of log entries of a log; and
flushing the plurality of log entries from the log, wherein said flushing includes performing deduplication of the plurality of data pages, said flushing including:
partitioning the plurality of data pages into a first portion and a second portion, wherein the first portion includes data pages of the plurality of data pages that are determined to be duplicates of existing data pages already stored on a storage system, and wherein the second portion includes data pages of the plurality of data pages determined to be unique data pages that are not duplicates of the existing data pages already stored on the storage system;
atomically incrementing reference counts each corresponding to one of the existing data pages determined as identical to one of the data pages of the first portion, where said each reference count denotes a number of times the corresponding one of the existing data pages is referenced and stored in a unique logical address; and
atomically binding the plurality of logical addresses to the plurality of data pages, wherein said atomically binding includes:
binding the first portion of data pages to a corresponding third portion of the plurality of logical addresses each storing one data page of the first portion written by one of the plurality of write operations;

binding the second portion of data pages to a corresponding fourth portion of the plurality of logical addresses each storing one data page of the second portion written by one of the plurality of write operations; and atomically binding metadata (MD) leaf entries to corresponding virtual layer block (VLB) entries, wherein each of the MD leaf entries is associated with one of the plurality of logical addresses, and wherein each of the corresponding VLB entries is associated with one of the plurality of data pages.

17. One or more non-transitory computer readable media comprising code stored thereon that, when executed, performs a method comprising:

receiving a plurality of write operations writing a plurality of data pages to a plurality of logical addresses, wherein each of the plurality of write operations writes one of the plurality of data pages to one of the plurality of logical addresses;

recording each of the plurality of write operations in one of a plurality of log entries of a log; and flushing the plurality of log entries from the log, wherein said flushing includes performing deduplication of the plurality of data pages, said flushing including:

partitioning the plurality of data pages into a first portion and a second portion, wherein the first portion includes data pages of the plurality of data pages that are determined to be duplicates of existing data pages already stored on a storage system, and wherein the second portion includes data pages of the plurality of data pages determined to be unique data pages that are not duplicates of the existing data pages already stored on the storage system;

atomically incrementing reference counts each corresponding to one of the existing data pages determined as identical to one of the data pages of the first portion, where said each reference count denotes a number of times the corresponding one of the existing data pages is referenced and stored in a unique logical address; and atomically binding the plurality of logical addresses to the plurality of data pages, wherein said atomically binding includes:

binding the first portion of data pages to a corresponding third portion of the plurality of logical addresses each storing one data page of the first portion written by one of the plurality of write operations;

binding the second portion of data pages to a corresponding fourth portion of the plurality of logical addresses each storing one data page of the second portion written by one of the plurality of write operations; and atomically binding metadata (MD) leaf entries to corresponding virtual layer block (VLB) entries, wherein each of the MD leaf entries is associated with one of the plurality of logical addresses, and wherein each of the corresponding VLB entries is associated with one of the plurality of data pages.

18. The one or more non-transitory computer readable media of claim 17, wherein the corresponding VLB entries include first existing VLB entries and first new VLB entries, wherein each VLB entry of the first existing VLB entries references or points to a physical storage location on non-volatile storage of one of the existing data pages determined to be identical to a data page of the first portion, and wherein each VLB entry of the first new VLB entries references or points to a physical storage location on non-volatile storage of one of the unique data pages of the second portion.

19. The one or more non-transitory computer readable media of claim 17, wherein said atomically incrementing reference counts is included in a first transaction, and said atomically binding is included in a second transaction different from the first transaction.

20. The one or more non-transitory computer readable media of claim 17, wherein said atomically incrementing the reference counts is performed prior to said atomically binding the plurality of logical addresses to the plurality of data pages, and wherein said atomically incrementing completes successfully and said atomically binding fails to complete successfully.

* * * * *